United States Patent
Newton et al.

(10) Patent No.: US 9,832,705 B1
(45) Date of Patent: Nov. 28, 2017

(54) METHODS, SYSTEMS, AND COMPUTER READABLE MEDIA FOR TOPOLOGY MANAGEMENT AND GEOGRAPHIC ROUTING IN MOBILE AD-HOC NETWORKS

(71) Applicant: The University of North Carolina at Chapel Hill, Chapel Hill, NC (US)

(72) Inventors: Benjamin Newton, Hillsborough, NC (US); Kevin Jeffay, Chapel Hill, NC (US); Jayashree Aikat, Chapel Hill, NC (US)

(73) Assignee: THE UNIVERSITY OF NORTH CAROLINA AT CHAPEL HILL, Chapel Hill, NC (US)

( * ) Notice: Subject to any disclaimer, the term of this patent is extended or adjusted under 35 U.S.C. 154(b) by 0 days.

(21) Appl. No.: 15/256,192

(22) Filed: Sep. 2, 2016

(51) Int. Cl.
*H04W 40/20* (2009.01)
*H04W 28/02* (2009.01)
*H04W 84/18* (2009.01)

(52) U.S. Cl.
CPC ......... *H04W 40/20* (2013.01); *H04W 28/021* (2013.01); *H04W 84/18* (2013.01)

(58) Field of Classification Search
None
See application file for complete search history.

(56) References Cited

U.S. PATENT DOCUMENTS

| | | | | |
|---|---|---|---|---|
| 6,167,263 | A * | 12/2000 | Campbell | B64B 1/06 244/164 |
| 6,374,080 | B2 * | 4/2002 | Uchida | H04B 7/18504 455/12.1 |
| 7,567,779 | B2 * | 7/2009 | Seligsohn | B64B 1/44 370/316 |
| 9,014,008 | B2 * | 4/2015 | Potkonjak | H04L 45/123 370/238 |

(Continued)

FOREIGN PATENT DOCUMENTS

| WO | WO 2013/106348 A1 | 7/2013 |
|---|---|---|
| WO | WO 2013/173002 A1 | 11/2013 |

OTHER PUBLICATIONS

Karp et al., GPSR: Greedy Perimeter Stateless Routing for Wireless Networks, Jul. 2000.*

(Continued)

*Primary Examiner* — Tejis Daya
(74) *Attorney, Agent, or Firm* — Jenkins, Wilson, Taylor & Hunt, P.A.

(57) ABSTRACT

Methods, systems, and computer readable media for topology management and geographic routing in mobile ad-hoc networks are disclosed. One method for geographic routing in mobile ad-hoc networks includes receiving a first packet requiring routing at a first mobile node configured to operate in a mobile ad-hoc network where the first mobile node and other mobile nodes move relative to each other and are connected using directional wireless communications links. The method also includes performing greedy routing for the (Continued)

first packet, and in response to determining that no next hop neighbor node is closer to the destination than the first mobile node, performing face routing of the first packet, wherein performing greedy routing or face routing includes storing local topology information at the mobile nodes and using the local topology information when making routing decisions.

20 Claims, 19 Drawing Sheets

(56) References Cited

U.S. PATENT DOCUMENTS

| | | | | |
|---|---|---|---|---|
| 2006/0259597 | A1* | 11/2006 | Jiang | H04W 40/20 709/222 |
| 2010/0172258 | A1* | 7/2010 | Yang | H04L 43/0811 370/252 |

OTHER PUBLICATIONS

Redi et al., "The DARPA WNaN Network Architecture," in 2011—MILCOM 2011 Military Communications Conference pp. 1-7 (Nov. 2011).
"Broad Agency Announcement BAA07-07 WNaN Adaptive Network Development (WAND)," DARPA, p. 1-5, (Feb. 2007).
Simonite, "10 breakthrough technologies: Project loon," MIT Technology Review—Best in Tech: 2015, pp. 1-9, (2016).
Frey, "Scalable geographic routing algorithms for wireless ad hoc networks," Network Mag. of Global Internetwkg., vol. 18, No. 4, pp. 18-22, (Jul. 2004).
"Aircraft situation display to industry: Functional description and interface control document," Volpe Center, Tech. Rep. Version 4.0, report No. ASDI-FD-001., p. 1-36, appendix A-1-C-2, (Aug. 2000).
Kuhn et al., "Ad-hoc networks beyond unit disk graphs," in Proceedings of the 2003 Joint Workshop on Foundations of Mobile Computing, ser. DIALM-POMC '03. New York, NY, USA: ACM, pp. 69-78 (2003).
Kim et al., "On the pitfalls of geographic face routing," in Proceedings of the 2005 Joint Workshop on Foundations of Mobile Computing, ser. DIALM-POMC '05. New York, NY, USA: ACM, pp. 34-43 (2005).
Kim et al., "Geographic routing made practical," in Proceedings of the 2Nd Conference on Symposium on Networked Systems Design & Implementation—vol. 2, ser. NSDI'05. Berkeley, CA, USA: USENIX Association, pp. 217-230 (2005).
Boche et al., "Antennas: state of the art," IEEE Vehicular Technology Magazine, vol. 1, No. 1, pp. 8-17, (Mar. 2006).
Balzano et al., "High capacity tactical networks with reconfigerable, steerable, narrow-beam agile point-to-point RF links," in Military Communications Conference, 2007. MILCOM 2007. IEEE, pp. 1-7 (Oct. 2007).
Stotts et al., "Progress towards reliable free-space optical networks," in Military Communications Conference, 2011—MILCOM 2011, pp. 1720-1726 (Nov. 2011).
Wohlsen, "Facebook drones to battle google balloons in the war of airborne internet," Wired, p. 1-3 (Mar. 2014).
Newton et al., "Analysis of topology algorithms for commercial airborne networks," in Network Protocols (ICNP), 2014 IEEE 22nd International Conference on, pp. 368-373 (Oct. 2014).
"Automatic Dependent Surveillance-Broadcast (ADS-B) Out Performance Requirements to Support Air Traffic Control (ATC) Service; Final Rule," 14 CFR Part 91, Department of Transportation—Federal Aviation RMinistration Std., p. 30160-30195 (May 2010).
Epstein et al., "Free space optical communications routing performance in highly dynamic airspace environments," in Proceedings of Aerospace Conference, IEEE, vol. 2, pp. 1398-1406 (2004).

Newton et al., "Simulating large-scale airborne networks with ns-3," in Proceedings of the 2015 Workshop on Ns-3, ser. WNS3 '15. New York, NY, USA: ACM, pp. 32-39 (2015).
Karp et al., "GPSR: Greedy perimeter stateless routing for wireless networks," in Proceedings of the 6th Annual International Conference on Mobile Computing and Networking, ser. MobiCom '00. New York, NY, USA: ACM, pp. 243-254 (2000).
Li et al., "A scalable location service for geographic ad hoc routing," in Proceedings of the 6th Annual International Conference on Mobile Computing and Networking, ser. MobiCom '00. New York, NY, USA: ACM, pp. 120-130 (2000).
Finn, "Routing and Addressing Problems in Large Metropolitan-Scale Internetworks," University of Southern California IRI Research Report ISI/RR-87-180, p. 1-65 (Mar. 1987).
Kranakis et al., "Compass Routing on Geometric Networks," in In Proc. 11 th Canadian Conference on Computational Geometry, pp. 1-4 (1999).
O'Brien, "Maze demystified," New York Times, p. 1-1 (Jul. 28, 1989).
Frey et al., "On Delivery Guarantees and Worst-Case Forwarding Bounds of Elementary Face Routing Components in Ad Hoc and Sensor Networks," IEEE Transactions on Computers, vol. 59, No. 9, pp. 1224-1238, (Sep. 2010).
Kuhn et al., "Worst-Case Optimal and Average-Case Efficient Geometric Ad-Hoc Routing," in Proceedings of the 4th ACM International Symposium on Mobile Ad Hoc Networking and Computing, ser. MobiHoc '03. New York, NY, USA: ACM, pp. 267-278 (2003).
Bose et al., "Routing with Guaranteed Delivery in Ad Hoc Wireless Networks," in Proceedings of the 3rd International Workshop on Discrete Algorithms and Methods for Mobile Computing and Communications, ser. DIALM '99. New York, NY, USA: ACM, pp. 48-55 (1999).
Cadger et al., "A Survey of Geographic Routing in Wireless Ad-Hoc Networks," IEEE Communications Surveys Tutorials, vol. 15, No. 2, pp. 621-653, Second Quarter (2013).
Kuhn et al., "Geometric ad-hoc routing: of theory and practice," in Proceedings of the Twenty-second Annual Symposium on Principles of Distributed Computing, ser. PODC '03. New York, NY, USA: ACM, pp. 63-72 (2003).
Leong et al., "Path vector face routing: geographic routing with local face information," in 13th IEEE International Conference on Network Protocols (ICNP'05), pp. 1-12 (Nov. 2005).
Johnson et al., "Dynamic source routing in ad hoc wireless networks," in Mobile Computing. Kluwer Academic Publishers, pp. 1-18 (1996).
Rosen et al., "Multiprotocol label switching architecture," Internet Requests for Comments, RFC Editor, RFC 3031, p. 1-53 (Jan. 2001).
Miyao et al., "LTRT: An efficient and reliable topology control algorithm for ad-hoc networks," IEEE Transactions on Wireless Communications, vol. 8, No. 12, pp. 6050-6058, (Dec. 2009).
Riley et al., "The ns-3 Network Simulator." in Modeling and Tools for Network Simulation, K. Wehrle, M. Gnes, and J. Gross, Eds. Springer, pp. 15-34 (2010).
Clausen et al., "Optimized Link State Routing Protocol (OLSR)," RFC 3626, Network Working Group, p. 1-65 (2003).
"2016 broadband progress report," Federal Communications Commission, FCC 16-6, Tech. Rep., p. 1-85 (Jan. 2016).
"State of connectivity 2015: A report on global internet access," internet.org by Facebook, Tech. Rep., p. 1-56 (Feb. 2016).
Kelly, "Internet access: Facebook looks to drones, lasers and satellites for internet access," CNN (Mar. 2014).
Peyronel et al., "Luminescent detector for free-space optical communication," Optica, vol. 3, No. 7, pp. 787-792, (Jul. 2016).
Demirors et al. "Seanet: A software-defined acoustic networking framework for reconfigurable underwater networking," in Proceedings of the 10th International Conference on Underwater Networks & Systems, ser. WUWNET '15. New York, NY, USA: ACM, p. 1-8 (2015).

(56) References Cited

OTHER PUBLICATIONS

Boroson et al., "The lunar laser communications demonstration (llcd)," in Space Mission Challenges for Information Technology, 2009. SMC-IT 2009. Third IEEE International Conference on, pp. 23-28 (Jul. 2009).

Santi, "Topology control in wireless ad hoc and sensor networks," ACM Comput. Surv., vol. 37, No. 2, pp. 164-194, (Jun. 2005).

Milner et al., "Free-space optical wireless links with topology control," pp. 175-180, 2002.

Huang et al., "Topology control for ad hoc networks with directional antennas," in Computer Communications and Networks, 2002. Proceedings. Eleventh International Conference on, pp. 16-21 (2002).

Ansari et al., "Efficient and reliable link state information dissemination," Communications Letters, IEEE, vol. 8, No. 5, pp. 317-319, (May 2004).

Krishnamurthi et al., "Topology control for future airborne networks," in Military Communications Conference, 2009. MILCOM 2009. IEEE, pp. 1-7 (2009).

Tiwari et al., "Mobility aware routing for the airborne network backbone," in Military Communications Conference, 2008. MILCOM 2008. IEEE, pp. 1-7 (2008).

Newton et al., "Concise Paper: Analysis of Topology Algorithms for Commerical Airborne Networks," 2014 IEEE 22nd International Conference on Network Protocols, p. 368-373 (2014).

\* cited by examiner

```
 1: function TAGFORWARD(h, incomingIf)
 2:     if h.d == self.id then
 3:         deliver packet
 4:     else
 5:         switch h.M
 6:             case GREEDY
 7:                 next = GREEDYORREVERTTOFACE(h)
 8:             case FACE-FWD
 9:                 next = FACECOMMON(h, incomingIf)
10:             case FACE-REV
11:                 next = FACECOMMON(h, incomingIf)
12:             case FACE-RETURN
13:                 if h.f == self.id then
14:                     next = EXPANDANDRESTARTFACE(h, incomingIf)
15:                 else
16:                     next = RIGHTHANDFORWARD(h, false)
17:                 end if
18:         forward to next and call TAGFORWARD
19:     end if
20: end function
```

FIG. 2

```
 1: function FACECOMMON(h, incomingIf)
 2:     next = RIGHTHANDFORWARD(h, false)
 3:     if h.M == FACE-FWD and self.id == h.f and next == h.e then
 4:         return failure                          ▷ No route to destination, drop
 5:     end if
 6:     if DIST(self.position, h.D) < DIST(h.F, h.D) then
 7:         return GREEDYORREVERTTOFACE(h)          ▷ Fall back to greedy
 8:     end if
 9:     if INTERSECTS(F, D, self.position, next.position) then
10:         return STARTFACE(h)
11:     end if
12:     if DIST(next.position, h.D) > h.r then
13:         next = REVERSETHEDIRECTION(h, incomingIf)
14:         if h.M == FACE-FWD then
15:             h.M = FACE-REV
16:             return next
17:         end if
18:         if h.f == self.id then
19:             return EXPANDANDRESTARTFACE(h)
20:         end if
21:         h.M = FACE-RETURN
22:         return next
23:     end if
24:     return next
25: end function
```

FIG. 3

1: function STARTFACE(h)
2: $h.M$ = FACE_FWD
3: $h.f$ = self.id
4: $h.F$ = self.position
5: nearest = FINDCONNECTEDNODENEARESTPOSITION(h, D)
6: $h.cw$ = RIGHTWAYTOREACH(nearest)  ▷ before always clockwise
7: $h.r$ = SMARTRADIUS(nearest, h, D)  ▷ before. DIST(F, D) * $\rho_0$
8: next = RIGHTHANDFORWARD(h, true)
9: $h.e$ = next
10: $h.t$ = time.Now()
11: return next
12: end function

FIG. 5

```
1: function DCP-KRUSKAL(G, maxDegree)
2:     A = ∅                                    ▷ A initialized to empty set
3:     for each v ∈ G.V do
4:         MAKE-SET(v)                          ▷ separate set for each vertex
5:         degree[v] = 0
6:     end for
7:     for each (u, v) ∈ G.E sorted by length, smallest first do
8:         if FIND-SET(u) ≠ FIND-SET(v) and degree[u] < maxDegree
   and degree[v] < maxDegree and (u,v) intersects no edge in A then
9:             A = A ∪ (u, v)
10:            UNION(u,v)
11:            degree[u]++
12:            degree[v]++
13:        end if
14:    end for
15:    return A
16: end function
```

FIG. 11

1: function DCP-TRT+L(G, node, maxDegree)
2:     T = DCP-KRUSKAL(G, maxDegree)
3:     H = G - T.E                    ▷ subtract T's edges from G
4:     U = DCP-KRUSKAL(H, maxDegree)
5:     Add edges U.E to T unless degree or planarity constraints are violated
6:     return ADDEDGES(G, T, node, maxDegree, longFirst)
7: end function

FIG. 12

1: function ADDEDGES(G, T, node, maxDegree, longOrShortFirst)
2:    remove edges in T from G
3:    if T.node.degree ¡ maxDegree then
4:       where possible move edges incident to node in G, longest first, from G to T while maintaining planarity and degree constraints
5:    end if
6:    where possible move edges, longest first, from G to T while maintaining planarity and degree constraints
7: end function

FIG. 13

METHODS, SYSTEMS, AND COMPUTER READABLE MEDIA FOR TOPOLOGY MANAGEMENT AND GEOGRAPHIC ROUTING IN MOBILE AD-HOC NETWORKS

TECHNICAL FIELD

The subject matter described herein relates to computer networking. More specifically, the subject matter relates to methods, systems, and computer readable media for topology management and geographic routing in mobile ad-hoc networks.

BACKGROUND

Mobile wireless ad-hoc networks consisting of thousands of mobile nodes are desirable for many applications. For example, the United States military has suggested utilizing a highly-adaptive "ultra-large" ad hoc network consisting of tens of thousands of nodes. Similarly, a large technology company has expressed interest in launching tens of thousands of networked balloons into the upper atmosphere in an effort to provide network access to users on the ground even in remote locations. Another example application may involve connecting thousands of in-flight commercial aircraft in the continental United States into a high-capacity airborne network. However, scaling ad-hoc networks to this size is difficult at best. In particular, efficient routing in such large dynamic networks is an open problem.

SUMMARY

Methods, systems, and computer readable media for topology management and geographic routing in mobile ad-hoc networks are disclosed. One method for geographic routing in mobile ad-hoc networks includes receiving a first packet requiring routing at a first mobile node configured to operate in a mobile ad-hoc network where the first mobile node and other mobile nodes move relative to each other and are connected using directional wireless communications links. The method also includes performing greedy routing for the first packet, wherein performing greedy routing includes determining whether a next hop neighbor node of the first mobile node is closer to a destination for the first packet and, in response to determining that the next hop neighbor node is closer to the destination for the first packet, forwarding the first packet to the next hop neighbor node. The method further includes in response to determining that no next hop neighbor node is closer to the destination than the first mobile node, performing face routing of the first packet, wherein performing face routing includes advancing from the first mobile node through nodes along a face boundary of a planar graph until a face routing early termination condition is met, the first mobile node is reached, or the destination is reached, wherein performing greedy routing or face routing further comprises storing local topology information at the mobile nodes and using the local topology information when making routing decisions.

A system for geographic routing in mobile ad-hoc networks is also disclosed. The system comprises a first mobile node comprising at least one memory, at least one processor, and a routing module (RM) implemented using the at least one processor and the at least one memory. The RM is configured for receiving a first packet requiring routing at the first mobile node configured to operate in a mobile ad-hoc network where the first mobile node and other mobile nodes move relative to each other and are connected using directional wireless communications links. The RM is also configured for performing greedy routing for the first packet, wherein performing greedy routing includes determining whether a next hop neighbor node of the first mobile node is closer to a destination for the first packet and, in response to determining that the next hop neighbor node is closer to the destination for the first packet, forwarding the first packet to the next hop neighbor node. The RM is further configured for in response to determining that no next hop neighbor node is closer to the destination than the first mobile node, performing face routing of the first packet, wherein performing face routing includes advancing from the first mobile node through nodes along a face boundary of a planar graph until a face routing early termination condition is met, the first mobile node is reached, or the destination is reached, wherein performing greedy routing or face routing further comprises storing local topology information at the mobile nodes and using the local topology information when making routing decisions.

The subject matter described herein can be implemented in software in combination with hardware and/or firmware. For example, the subject matter described herein can be implemented in software executed by at least one processor. In one example implementation, the subject matter described herein may be implemented using at least one computer readable medium having stored thereon computer executable instructions that when executed by at least one processor of a computer control the computer to perform steps. Exemplary computer readable media suitable for implementing the subject matter described herein include non-transitory devices, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

As used herein, the terms "node" and "host" refer to a physical computing platform or device including one or more processors and memory.

As used herein, the terms "function" and "module" refer to software in combination with hardware and/or firmware for implementing features described herein.

BRIEF DESCRIPTION OF THE DRAWINGS

Some embodiments of the subject matter described herein will now be explained with reference to the accompanying drawings, wherein like reference numerals represent like parts, of which:

FIG. 2 depicts a routing function or method known as TAGFORWARD;

FIG. 3 depicts a routing function or method known as FACECOMMON;

FIG. 5 depicts a routing function or method known as STARTFACE;

FIG. 11 depicts a function or method for a degree-constrained planar Kruskal (DCP-Kruskal) algorithm;

FIG. 12 depicts a function or method for a degree-constrained planar tree-based reliable topology plus long (DCP-TRT+L) algorithm;

FIG. 13 depicts a function or method known as AddEdges that finds viable connections which were not yet utilized by a topology algorithm;

DETAILED DESCRIPTION

Soon extremely large scale mobile ad-hoc networks of thousands or tens of thousands of mobile nodes will be physically feasible and desirable for a host of applications. However, routing within these networks is challenging, especially at high data rates and when node movement is highly dynamic. Some aspects of the subject matter described herein include a position-based routing protocol referred to herein as topology aware geographic routing protocol (TAG). For example, in some embodiments, TAG may use local topology information (when available) to make better local forwarding decisions thereby decreasing the number of hops required to deliver a packet when compared with other geographic routing protocols. Further, in some embodiments, TAG may be able to reliably deliver packets even in topologies which violate the often used but unrealistic unit disk graph and quasi-static assumptions. Empirical results from a variety of simulations are also provided, which illustrate how an example implementation of TAG can outperform existing protocols, such as GOAFR+, GFG, and OLSR, in both theoretical environments and in a simulated, real-world, continental-scale airborne network.

Geographic Routing

Geographic routing (also called geometric or position-based routing) considers the physical positions of the nodes when making forwarding decisions. This unique routing strategy has been proposed as one solution to the challenge of routing in huge mobile ad-hoc networks [5]. Much of the work in this domain, however, has been largely theoretical, ignoring many real-world concerns, such as a realistic and constantly changing topology. In this work we introduce Topology Aware Geographic Routing (TAG) a new geographic routing protocol which is able to essentially guarantee delivery while supporting constantly changing topologies which are not restricted to be unit disk graphs. Further, we show how the new protocol can achieve even better performance by taking advantage of local topology information.

Figure 1:
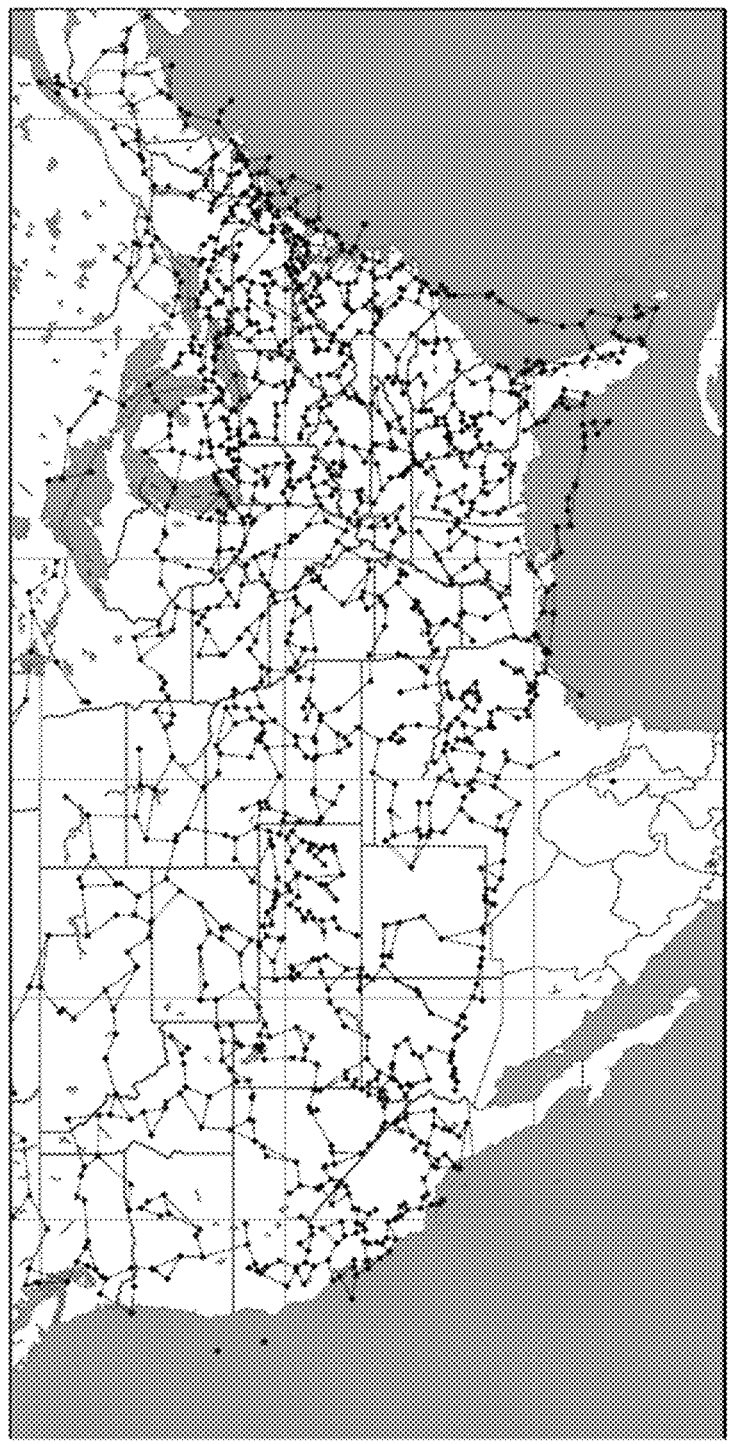
FIG. 1 depicts actual positions (dots) of commercial aircraft above 10,000 feet altitude at 2:00 p.m. on Jul. 9, 2015, as reported by the Federal Aviation Administration's (FAA's) Aircraft Situation Display to Industry (ASDI) data, and conceivable connections (lines) between directional links on the aircraft forming a continental-scale network.

The development of this new geographic routing protocol is motivated by our desire to develop a set of protocols sufficient to enable high-bandwidth communication among a large set of high flying aircraft. Such a network could be utilized for a host of applications, especially if it were connected to the Internet. FIG. 1 depicts actual positions (dots) of commercial aircraft above 10,000 feet altitude at 2:00 p.m. on Jul. 9, 2015, as reported by the Federal Aviation Administration's (FAA's) Aircraft Situation Display to Industry (ASDI) data [6]. The figure also shows a conceivable topology (gray edges) for interconnecting these aircraft assuming each plane is equipped with three directional data links (as described below). The topology of such a network is constantly changing as nodes (aircraft) join or leave the network, and as nodes move in and out of one another's communication range. Our goal is a routing protocol that can successfully deliver a high percentage of packets in such a constantly changing network, while keeping the overhead minimal.

Terminology

The description of our work is more clear with the addition of a few concepts and terms. Here we define the terms used in this work. A node is a single network entity. For airborne network applications a node is an airborne platform (such as an aircraft or balloon). Each node bears a static number of directional data links, sometimes referred to as links. Directional data links point, focusing their transmission energy in a specific direction. A link (the transceiver attached to a node) should not be confused with a connection which is formed when two directional data links point at and synchronize with one another such that data can be exchanged. A one-way connection is one where a link is pointed at a neighbor, but where that neighbor has not (yet) reciprocated.

A topology is a set of connections. If only nearby nodes are included in the topology it is a local topology, whereas a global topology includes all nodes. A topology graph is a representation of a topology where the connections are viewed as the edges between vertices representing the nodes at the ends of the connections. A two-dimensional topology graph may ensure that its edges intersect only at vertices, in which case the graph is a planar graph. A topology graph is connected if there is a path between every pair of vertices. If a topology graph is not connected, it is made up of a set of connected components, where each component is a connected subgraph of the topology graph. The maximum degree of a node refers to the number of links it has, or the number of connections it can be a part of, whereas the degree of a node or vertex in a graph is the number of incident edges it currently has.

Each link has a maximum transmission range or range which is the longest separation distance over which two correctly pointed links can communicate. All nodes within this range are called neighbors. However, unlike omnidirectional links, which can communicate with any neighbor, directional data links can only communicate with directly connected neighbors, or in other words, neighbors with which a connection exists. The set of potential connections for a node includes a connection to each neighbor.

The community of a node may refer to all nodes (community members) within some community range, within which nodes exchange position information (potentially via a separate omni-directional system). The topology of a wireless network is often theoretically modeled as a unit disk graph (UDG), where edges exist only between all pairs of vertices whose separation distance is less than some threshold (i.e. the maximum transmission range).

Unit Disk Graphs

Before packets can be routed, network nodes may first establish communication links with other nodes. The network topology indicates the arrangement of these links between nodes in the network. For traditional wired networks the network topology is determined by the physical cables connecting network nodes, and it is generally fairly static. In contrast, most wireless networks use omni-directional antennas to transmit their messages in all directions to all nodes within some maximum range. The topology of a wireless network is often modeled as a unit disk graph (UDG), where an edge exists between any two nodes whose separation distance is less than 1 unit (the maximum range). In other words, a node is always connected to all other nodes within the maximum transmission range (which has been normalized to 1 unit), and is never connected to any node outside that range [7]. The unit disk graph is an accurate model of a 2-dimensional wireless network if: (1) all nodes have the same transmission power, and the same receive gain, yielding the same maximum transmission radius, (2) every node's transmission pattern is a perfect circle (each node transmits and receives equally in every direction), and (3) there are no radio opaque obstacles and no multipathing to interfere with this perfect transmission. While convenient for theoretical analysis, unit disk graphs rarely match real-world wireless network topologies [7], [8], [9].

Directional Data Links and Topologies

Another option for wireless communication is the use of directional data links. Rather than communicating by sending energy in all directions, these nodes utilize "smart" antennas [10], to instead focus their transmission energy towards the intended receivers, enabling lower energy use, longer ranges, and less interference. Directional Radio Frequency (RF) links have been used by the military for years [11], enabling long-range covert communications. Free-Space Optics (FSO) is another cutting-edge directional communication method that is becoming more attractive as demand for higher data rates increases and frequency spectrum allocations become more difficult to obtain. These steerable directional FSO links communicate using pulses of light from a laser, essentially enabling wireless fiber-optics. DARPA has demonstrated rates up to 10 Gbps and distances up to 200 km using a hybrid RF/FSO link [12]. Some technology companies have proposed utilizing FSO links in their airborne balloon [13] and airborne drone [14] networks. In our research we consider commercial aircraft outfitted with three FSO transceivers.

Unlike an omni-directional link which essentially forms connections with every other node within range, a Free-Space Optics directional link can form a connection with only one other node at a time. Thus, the degree (number of incident edges) at each vertex in a directional network topology graph is limited to the number of FSO links on the associated node. More importantly, the topology for a network using directional links must be explicitly managed, and some protocol must decide which of the possibly many potential neighbors a link should point at and connect with. Networks of directional links avoid contention and interference at the cost of having a more complicated topology which must be managed.

Airborne Network Topology Management

As mentioned earlier, one motivating application for our proposed routing protocol is a continental-scale airborne network of commercial cargo and passenger aircraft. To connect these airplanes to one another at high data rates over long ranges requires the use of directional links (FSO or RF). The use of directional links, in turn, requires a topology management protocol to explicitly manage which links point at what other nodes as the airplanes move and the topology evolves.

In our prior work [15] we introduce a distributed topology management algorithm, called DCTRT, for forming a degree-constrained topology graph among the nodes. Nodes using this algorithm and associated protocol are able to actively manage a large-scale network topology in a decentralized manner, exchanging nothing more than position information with nearby nodes. Given only this position information, each node periodically computes a local topology, and establishes the links in the topology incident at that node. Because there is no explicit connection agreement between nodes, there can be cases where links are pointed at nodes that don't reciprocate. However, generally, given a dense enough network and the right algorithm, a sufficient topology is produced.

For our airborne network we note that the FAA has mandated that by the year 2020 every aircraft operating in controlled airspace (classes A, B or C of the U.S. National Airspace System) must constantly broadcast their position information using Automatic Dependent Surveillance—Broadcast (ADS-B) [16]. This information is received by FAA systems and other aircraft, effectively allowing aircraft to exchange their position information with all other in-range aircraft once a second. By utilizing this ADS-B information, our topology management scheme is able to operate with absolutely no overhead on the directional links.

MANET Routing Protocols

Mobile ad-hoc networks typically employ nodes that act as both routers and end-users. Nodes that are not within mutual transmission range of one another must communicate by relaying their messages through a series of intermediate nodes, each node acting as a router. A routing protocol is needed to determine at each node in the series, where the message should be forwarded next. Traditional routing protocols are not well suited for routing in networks where the topology changes frequently [17]. Mobile ad-hoc network (MANET) routing protocols are designed to support networks of mobile nodes, but even these protocols often fail to efficiently route packets in highly-dynamic, large-scale networks [18]. Consider, for example, a network of ten thousand mobile nodes, and two nodes on opposite edges of this network trying to communicate. A reactive MANET routing protocol (one which seeks to establish routes "on demand"), will need to buffer packets until it can find a path through the network to the distant node. Once a path is found packets may begin flowing. However, unless the nodes along the path are essentially stationary, there is a high probability the path will quickly become invalid. All it takes is one node along the path to leave the network or move out of range of an adjacent node supporting the path to make the path obsolete. Packets must then be delayed or dropped while the path is repaired, and extra management packets will likely need to be sent, incurring overhead.

Using, instead, a proactive routing protocol (which seeks to always maintain routes between every pair of nodes) only exacerbates the situation, generating what has been described as torrents of link status change messages in an effort to recover from any failure on any path [19]. The overhead associated with these messages can quickly saturate the available network bandwidth for large networks with a frequently changing topology. Despite the high cost, only a fraction of the packets may actually arrive at their intended destinations because the routing information so quickly becomes stale. In contrast, geographic routing protocols don't actively maintain routes, and never need to determine or repair paths through the network.

Geographic Routing Protocols

Geographic routing protocols forward packets based on the geographic position of the destination, not by identity or address. The nodes supporting a geographic routing protocol need only store minimal information about other nearby nodes, and never global topology or path information. There is no need to set up a path because hop-by-hop decisions are made about where the packet should be forwarded next. This allows the protocols to quickly adapt to changes in the network while avoiding stale information.

These protocols, however, assume that a node is aware of its own physical location and the positions of nearby nodes. Further, these protocols require that a sending node knows the position of a packet's intended destination. This information is often obtained using a separate location service protocol [20]. As described previously, in our example airborne network application, the positions of nearby nodes are fortuitously already being exchanged via ADS-B [16]. We call nodes that are within transmission range that node's neighbors, and nodes that are within position exchange (e.g., ADS-B) range its community members. Neighbors to which a connection exists are referred to as directly connected neighbors.

There are two main approaches to geographic routing: greedy routing and face routing. In greedy routing (aka greedy forwarding or earlier as Cartesian routing) each node a packet visits attempts to greedily forward it so that it minimizes the distance to the destination [21]. At each hop the packet is forwarded to whichever directly connected neighbor is nearest the packet's destination. Greedy routing is generally efficient, but it alone cannot guarantee delivery in arbitrary networks. If the packet reaches a node whose neighbors are all further away from the destination than it is, the packet has reached a dead end, or local minimum, and cannot make greedy progress. If local minima exist in a topology greedy routing must employ some other method to assist in backtracking and routing around the void (or hole) in the topology.

Face Routing (aka Compass Routing II) is the other main geographic routing approach [22]. It may require that the topology graph be planar. A planar graph is one where no two edges cross, or in other words, one where all edge intersections occur at vertices. A planar graph, therefore, consists of a set of regions, called faces, bounded by edges. There may be many interior faces, which make up a graph, but always also one extra exterior face which encompasses all other space. Face routing seeks to traverse faces of the planar graph, while at each step advancing towards the destination.

To better understand face routing, it may help to visualize the planar graph as a maze. The edges are corridors of the maze, and the vertices are small rooms with a doorway leading to a corridor for each of the potentially many adjacent edges. The following right-hand rule applies equally well to solving mazes and exploring the boundaries of faces in a planar graph. "Upon entering the maze, always follow the wall to your right. When confronted by an intersection, always turn right, keeping the wall always to your right" [23]. Just as one can get out of any maze by keeping their right hand on the right entry wall, one can always travel around the entire boundary of any face by, at each room (vertex), taking the doorway to the corridor (incident edge) immediately to the right. To determine which edge (corridor) should be used to initially start exploring a face boundary, one may imagine traveling from the center of the face which is to be traversed towards the start vertex, and following the same right hand rule upon reaching the vertex (enter the first doorway to your right). Note that one could, with equivalent results, instead use the left-hand rule (always turning left) to travel the opposite direction around any face.

Various face routing methods utilize the right-hand and/or left-hand rules to traverse the faces of a planar graph and arrive at the destination. The general concept is to have a packet travel around one face until an adjacent face is found which is closer to the destination. The algorithm then changes faces, and begins exploring the boundary of the new face. If the topology graph is static, planar, and based on a unit disk graph, and node locations are accurate, face routing guarantees that one of two things always eventually happen: (1) the destination is encountered while exploring a face boundary, in which case the packet can be delivered, or (2) an entire face boundary is explored and no adjacent face is found that is closer to the destination. In the second case, the destination is always unreachable given the assumptions above. However, these assumptions are not always easy to guarantee [24].

Greedy and face routing are often combined producing so-called hybrid greedy-face routing protocols, or greedy-face-greedy protocols. These protocols start routing greedily until a local minimum is reached, at which point face routing is used to route around the face between the local minimum and the destination. Greedy routing then takes back over, until another dead end is reached. Many geographic routing protocols employ this greedy-face-greedy cycle but in a variety of different ways [19], [25], and [26].

Related Works

Here we briefly discuss some geographic routing protocols. (For more details see [27].) GFG [26] was the first routing protocol to combine greedy and face routing. Upon reaching a local minimum GFG employs face routing until reaching a node that is located closer to the destination than the node where face routing commenced, at which point it returns to greedy routing. Greedy Perimeter Stateless Routing (GPSR) [19] is largely a duplication of GFG with minor variations.

The GOAFR (pronounced "gopher") family of protocols build on a slightly modified version of face routing called Adaptive Face Routing (AFR) [25], [28]. One challenge with face routing is deciding in which direction a face boundary should be explored. It is possible that exploring in a clockwise manner could result a huge number of edges being explored before switching back to greedy routing, whereas exploring the same face in a counter-clockwise manner would return to greedy routing after just a couple of hops. Adaptive Face Routing (AFR) employs a bounding circle or ellipse that can be adaptively increased as a packet attempts to find the optimal direction. Greedy Other Adaptive Face Routing Plus (GOAFR+) combines greedy routing and a version of AFR to arrive at a geographic routing protocol which is provably worst-case optimal and average-case efficient. GOAFR+ is the geographic routing protocol which most closely matches TAG.

Another method is employed by [29], where the Greedy Path Vector Face Routing (GPVFR) algorithm, which exchanges path vector information between nodes, is shown to out perform both GOAFR+ and GPSR. GPVFR's use of topology information is similar to an example implementation of TAG. However, advantageously and in contrast to GPVFR, TAG may not require extra overhead to exchange information. Further, existing geographic routing protocols (including GOAFR+ and GPVFR) generally assume a quasi-static topology, one that does not change for the duration of a particular routing activity. Advantageously, TAG can overcome this assumption, supporting topology changes even while packets are in flight.

Topology Aware Geographic Routing (TAG)

We now describe some example features of a new geographic routing protocol. First we describe an example header structure and related contents for TAG, and then we detail a base version of TAG. The base version is essentially a greedy-face-greedy algorithm with the addition of a bounding circle much like that used in GOAFR+ [25]. Further, we describe various potential extensions to the base protocol below.

Shim Header

The only source of overhead for our routing protocol is the addition of an extra header to each packet's contents. This is a "shim header" like that used in Dynamic Source Routing (DSR) [30], or even MPLS [31] in wired networks. In contrast to protocols such as DSR, however, the size of our header does not grow with the length of the path or the size of the network. Table 1 lists and describes contents (e.g., fields) of an example TAG header, and Table 2 lists input parameters and default values for an example implementation of TAG.

TABLE 1

| | |
|---|---|
| M | Mode: GREEDY, FACE-FWD, FACE-REV, or FACE-RETURN |
| s | Source Node ID |
| d | Destination Node ID |
| D | Destination Location (x, y) |
| f | Face Start Node ID |
| F | Face Start Location (x, y) |
| e | first edge traversed (ID of 2nd node visited) |
| cw | Direction (clockwise or counter-clockwise) |
| r | Radius of the bounding circle |
| t | time started face |

TABLE 2

| | | |
|---|---|---|
| po | Initial Bounding Circle Radius (used only in base version) | 1.4 |
| p | radius increase factor | $\sqrt{2}$ |
| c | position exchange range | 1.44 or 288 km |
| l | maximum link range | 1.0 or 200 km |
| n | links per node (degree) | 3 |
| u | topology update rate | once per second |

Each node is assumed to have a single unique identifier (node ID). This value could be the IP address associated with one of its interfaces, or any other node unique value. The header first includes a mode flag, M. This value enables each packet to independently store which of four modes it is operating in (greedy mode or one of three face routing modes). Next, the header includes a source node ID, s, a destination node ID, d, and the ID of the node where the packet last began tracing the boundary of a face (face start node ID), f. In addition, e stores the node ID of the second node visited (or to be visited) while tracing the boundary of a face. In conjunction with f, this value essentially encodes the first edge traversed on the current face. D and F store the destination location and the face start location respectively. The Boolean cw value facilitates the choice of tracing a face boundary in either a clockwise (right-hand rule) or a counter-clockwise (left-hand rule) direction. The radius of the packet's current bounding circle (which will be described shortly) is stored in r. Finally, t stores the time at which this packet began tracing the boundary of a face. If the nodes were assumed to be static, or even quasi-static, s, d, f, and t would not be necessary, and e could be replaced with a position value. The inclusion of these extra header fields is one of the costs of fully supporting node movement. Assuming 16-bit values suffice for location resolution, and assuming the radius and time values also require only 16 bits each, 256 nodes may be supported with a 17-byte header, and 65,536 nodes with a 21-byte header.

Algorithm Overview

Since face routing may require a 2-dimensional topology graph, the positions used for the geographic routing described herein the positions of the nodes projected onto a 2-dimensional plane, unless stated otherwise.

One example base algorithm associated with TAG works by first greedily advancing until either reaching the destination or a local minimum (GREEDY). If the destination is reached, the packet is delivered, and our job is done. Otherwise, upon reaching a local minimum the packet changes to face routing mode (FACE-FWD), and begins tracing, in a clockwise direction, the boundary of the face first encountered by a line extending from the current node towards the destination.

In some embodiments, face routing may involve a packet visiting nodes along the boundary of the face until a face routing early termination condition is met, the packet returns to the local minimum node having traced the entire boundary of the face, or the packet arrives at the destination node. Various face routing early termination conditions may be utilized for indicating when and/or whether to terminate face routing. For example, a "first closer" face routing early termination condition may be met when a node is encountered that is closer to the destination than the node where face routing started. In another example, a face routing early termination condition may be met when the number of visited nodes that are nearer to the destination is greater than the number of visited nodes that are further from the destination.

In some embodiments, when a "first closer" face routing early termination condition is used, the packet begins routing around this face inside of an annulus (a rind-shaped object) centered at the destination. The space inside the inner circle of the annulus is closer to the destination than the node (f) where this packet started face routing, and the radius of the inner circle is equal to the distance from the face start position (F) to the destination (D). The outer circle is a bounding circle whose radius (r) was set when switching to face routing mode. If the packet crosses the inner circle it has made progress, and is now closer to the destination than when it began face routing. It may now safely attempt to switch back to GREEDY mode, or wait until a different face routing early termination condition is met. If, on the other hand, the packet would cross the outer circle on its next hop, cw is flipped and the packet begins backtracking (in the counter-clockwise direction). The packet eventually arrives at the node where it began face routing (f), and continues tracing the face in the opposite direction (FACE-REV). As before, if the packet crosses the inner circle it transitions to GREEDY mode, but if on its next hop it would cross the outer circle, cw is again flipped (again exploring clockwise), and the packet transitions to the FACE-RETURN mode. This will cause the packet to backtrack all the way to the node where it started face routing (f). Finally, the radius of the outer circle (r) is increased, and the packet begins the entire face routing procedure again, starting in the FACE-FWD mode. While face routing, if the packet ever encounters the destination, it is delivered. If however, while in FACE-FWD mode, the packet detects that it has traced the entire boundary of a face, there is no path to the destination, and the packet is intentionally dropped. Dropping the packet at this point is actually a critical benefit of Face Routing, for if the packet were allowed to continue trying to reach the unreachable destination, it would waste valuable resources while it looped indefinitely.

Algorithm Details

Before each packet begins its journey, the position of its intended destination may be determined. Depending on the type of network and destination node, the destination position may need to be obtained from a separate location service such as [20].

For each new packet to be routed, the destination position and ID (D and d) are added to the shim header, along with the source node (current node) ID. Every packet starts in GREEDY mode (M=GREEDY). The shim header is attached to the packet and then the TAGFORWARD function, shown in FIG. 2, is called.

FIG. 2 depicts a routing function or method known as TAGFORWARD. TAGFORWARD is the main routing function, and is called at each hop along the path. If the packet has reached its destination the packet is delivered. Otherwise various methods are called depending on which mode the packet is in, with each method returning the ID of the node to which the packet should be sent next. For packets in GREEDY mode, the GREEDYORREVERTTOFACE function is called to either send the packet to the neighbor that is nearest the destination, or revert to face routing if the current node is a local minimum. If the packet is in FACE-FWD or FACE-REV, the FACECOMMON function, shown in FIG. 3, is called. For packets in the FACE-RETURN mode (in which the packet is returning to the face start node), the next node to be visited while backtracking to the face start node is determined by the RIGHTHANDFORWARD function. If, however, the packet has reached the face start node, the boundary circle is expanded and face routing is restarted by (EXPANDANDRESTARTFACE). Lastly, if the packet is in FACE-FWD or FACE-REV the FACECOMMON function is called.

FIG. 3 depicts a routing function or method known as FACECOMMON. The FACECOMMON function first determines the proposed next node to be visited according to the right-hand rule. If the packet is (1) in FACE-FWD mode, (2) at the face start node f, and (3) expected to visit node e next, the packet has made a full loop around the face, and it is mercifully dropped because there is no route to the destination. If instead, the packet reaches a node that is nearer the destination than the face start node, it calls GREEDYORREVERTTOFACE. This method starts greedily routing unless this node is found to be another local minimum, in which case face routing is started on the face between this node and the destination. Ignoring for now, the highlighted code, if the proposed next node lies outside the bounding circle then if the packet was in FACE-FWD mode, we REVERSETHEDIRECTION the packet was traveling in (changing directions, for example, from clockwise to counter-clockwise) and change to FACE-REV mode. If instead the packet was already in FACE-REV mode we also REVERSETHEDIRECTION in which the packet is traveling and change to FACE-RETURN mode. In some cases the packet is already at the face start node so the FACE-RETURN mode is skipped and the bounding circle is immediately expanded and face routing restarted with EXPANDANDRESTARTFACE.

Non-Unit Disk Graph Support

Our face routing algorithm assumes that at some point while traveling around any face one of three events will occur: (1) the packet will arrive at the destination, (2) the packet will arrive at a node which is closer to the destination than the node at which face routing began, or (3) only if there is no route to the destination, the packet will arrive back at the node at which it started, having traversed the entire face. The implied assumption in these cases is that either there is a node closer to the destination on the face that stands between the start node and the destination, or the destination is unreachable. This assumption is true in a unit disk graph, but what of the scenario shown in FIG. 4 where S is the source of a packet; D the destination, and the circle encompasses the space which is closer to D than A?

Figure 4:
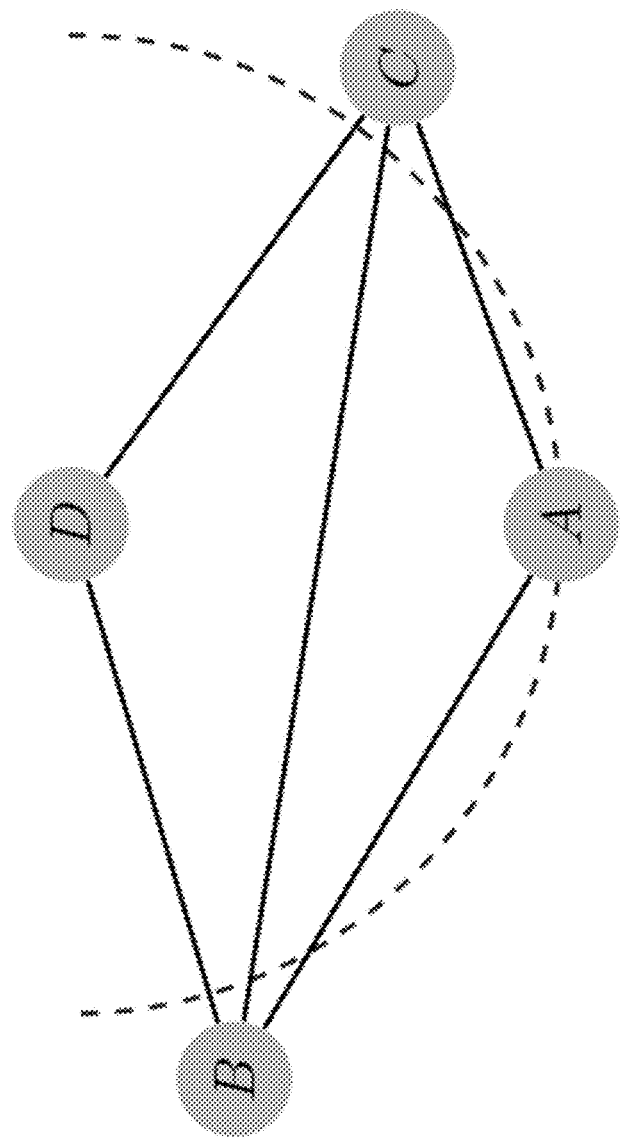
FIG. 4 depicts an example of a topology that violates the Unit Disk Graph assumption.

FIG. 4 depicts an example of a topology that violates the Unit Disk Graph assumption. In FIG. 4, note that B and C are both outside the large circle, and are both further from D than A. This also means that A is a local minimum. If the unit disk graph assumption is employed here, A and D would have to be connected, since they are closer to one another than C and D (which are presumably closer to one another than 1 unit). Since this is not a unit disk graph, tracing the boundary of the face from A to B to C bring us back to A without finding any node which is closer to D. This violates the assumption of our proposed routing scheme, since there is a route to the destination through B or C.

To overcome this issue we add three lines to the FACECOMMON function (lines 10-12 are highlighted in grey). As the packet moves around the face, we intersect the line segment representing the next edge to be traversed with the line segment extending from the face start position to the destination position in a manner similar to basic face routing [22]. If an intersection is detected, we restart face routing at the current node. The packet will then seek to navigate the face between the current node and the destination. Depending on the geometry of the graph, the next face traversed may not be the next face encountered by the line which intersected the edge, however, progress towards the destination has been made. This very simple change to our algorithm allows us to conquer the potential issues with non-unit disk graphs.

Topology Awareness

We now propose various enhancements to the base algorithm described above for cases where a node has or can obtain local information regarding the topology of the network. The base algorithm outlined above has a few key decision points, and we propose using any topology information available to help make the best possible decisions. Note that in general performance can be improved without global topology information, and even when local topology information differs from the actual global topology. Nodes need not learn the entire topology to benefit from the topology awareness enhancements!

When face routing is initiated for a packet, the packet can travel in a clockwise direction (right-hand), or travel in a counter-clockwise direction. If topology information is available, a better choice can be made about which direction to begin tracing the face boundary. Similarly, if some topology information is available, the initial radius of the bounding circle can be set intelligently. Topology information can also assist in the selection of the next hop for greedy routing, enabling a more global greedy choice. The immediate next greedy hop, however, must always make progress towards the destination.

To enable this enhancement local Topology information can be exchanged periodically via some other protocol, incurring an overhead penalty. However, in the case where a topology management protocol is employed, the local topology information may already be known by each node. In protocols such as LTRT [32] nodes use the positions of their neighbors to compute their own view of the local topology and make local transmission power decisions, ultimately controlling the network topology. Similarly, networks supported by directional links can use similar distributed topology management protocols to determine where to point their directional links. The nodes in these networks already have the local topology information necessary for to benefit from this enhancement without any extra overhead.

Since this information is essentially only used to provide "hints" to the routing protocol, it doesn't even have to be correct. If a packet starts face routing in the non-optimal direction, it will eventually turn around and go the other way. If a chosen bounding circle size is too small, it will eventually be increased. This is important, because in the case where local topology management protocols are used, the local topology information does not always match the global topology.

FIG. 5 depicts a routing function or method known as STARTFACE. The STARTFACE function shows how the topology aware aspects can be inserted into our face routing function. This function is called any time a packet is to begin routing around a face. Its purpose is to set up the header values correctly for face routing. The highlighted lines are the only lines added or changed to support topology awareness. We call two nodes connected if the local topology graph contains a path between them, and we call two nodes directly connected, if they are connected with a path of length hop. The FINDCONNECTEDNODENEARESTPOSITION function uses the available local topology graph to find and return the ID of the node nearest the destination to which there is a path from this node.

An additional function, RIGHTWAYTOREACH takes the nearest node ID and determines which direction (counter-clockwise or clockwise) face routing should proceed to efficiently reach the nearest node. This is far better than our base protocol, where faces boundaries were always initially traced in a clockwise direction. Lastly, the SMARTRADIUS function determines the appropriate radius value for the bounding circle. Previously, as in GOAFR+ this value was set to the product of the distance from F to D and an initial radius factor. The SMARTRADIUS function determines which node on the path to the "nearest" node is furthest from the D and uses that distance as the radius value, ensuring that the expected path can be traveled without increasing the radius. In cases where the "nearest" node is the current node, the radius is set such that the bounding circle encompasses the entire area within which the local topology is known.

Dealing with Topology Changes

Figure 6:
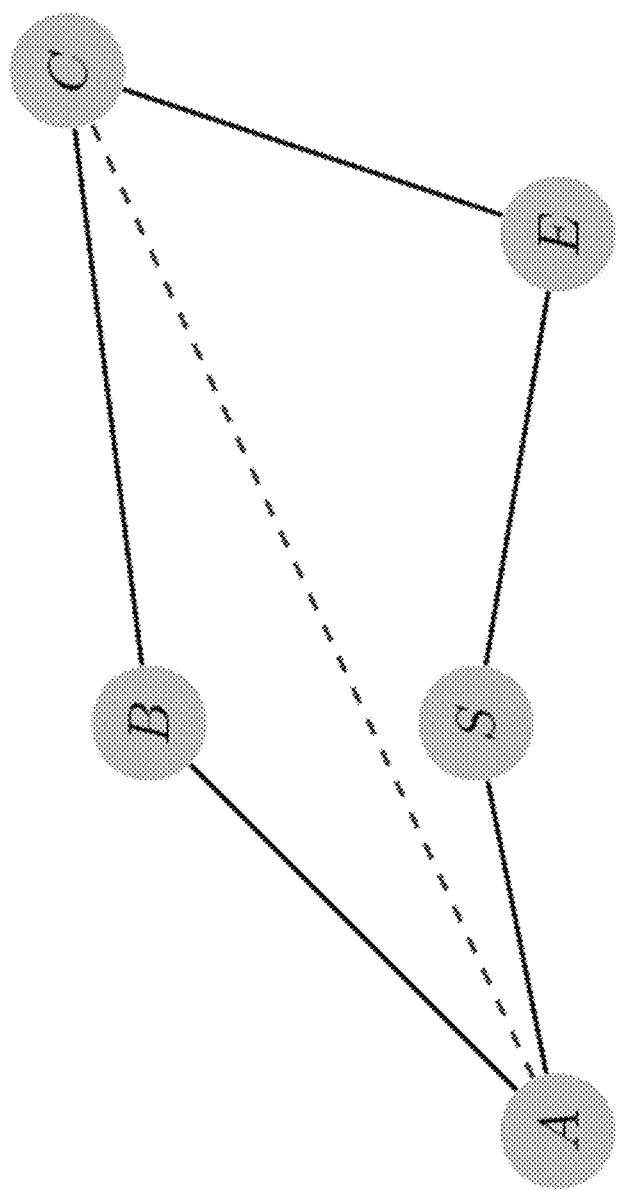
FIG. 6 depicts face routing issues when nodes move and the topology graph changes.

Standard face routing can fail miserably when the movement of nodes causes changes in the topology. For example, FIG. 6 depicts a topology of five nodes. Assume that initially the edge between nodes A and C does not exist. A packet beginning face routing at node S and traveling clockwise would visit node A, then B. Now assume that while the packet is at node B, the network topology changes and the edge between A and C is added. Upon reaching node C the packet would use the right-hand rule to determine where to go next, and would find that the new edge should be traversed, sending the packet to A, not to node E. A would again forward the packet to B, and B to C, and the packet would be stuck in a potentially infinite routing loop.

Most other geographic routing protocols assume a static or quasi-static network topology, suggesting that the routing is so fast compared to the node movement that no topology changes happen while a packet is in flight. This is obviously not realistic, as in a busy network there will always be packets flowing, some of which will be affected by a topology change. To our knowledge we are the first to propose a greedy-face-greedy style geographic routing protocol which can operate correctly on topology graphs which are constantly changing.

Approach

One example approach for dealing with topology changes is to essentially take a snapshot of a face (in a distributed manner) each time a packet begins tracing a face boundary. The snapshot, not the potentially changed current topology, is then used to determine how to forward the packet around the face.

FIG. 6 depicts face routing issues when nodes move and the topology graph changes. Using the example in FIG. 6, assume the packet is again at node S and is begin routed around the face in a clockwise direction. This time, however, the packet follows the face as it existed at the time face routing began. The packet would visit node A, then B, then C. Node C would realize that at the time the face traversal began, its connection to node A did not exist, and so would correctly forward the packet to E, avoiding the potential routing loop.

What if, however, instead of the link between A and C being added to the graph, it was instead taken away? Assume the packet starts at node S, where it takes a virtual "snapshot" of the face that includes the connection from A to C, and while traveling to node A, the link from A to C goes away. We need a way to get the packet to node C and allow it to continue to traverse the face, but the direct path no longer exists. The packet could, instead, take the indirect path to C, traveling through node B. Below we will describe how this can be done.

Storing the Snapshot

To support topology changes while a packet is in-flight we propose sending a packet along the face as it existed at a previous point in time. To achieve this, we add a time field, t to the packet header, that corresponds to the time at which the current face boundary began being traced. In addition, every node stores in a small buffer the positions and IDs of nodes they have recently (in the last few seconds) been directly connected to. The amount of storage required may be essentially controlled by the maximum degree of each node. When a node needs to determine where to forward a packet as it travels around a face, it need only use the time stored in the packet to look up the IDs and positions of nodes it was connected to at the given time. It then makes the routing decision it would have made at the time face routing began, and the virtual "snapshot" was taken.

Via-Points

Our proposed method works until the rare situation is encountered where a node is no longer directly connected to the next node on the face snapshot. To overcome this, we note that our routing protocol allows a packet to be routed to any node whose position and ID are known. Since the position and ID of the next node along the boundary of the snapshot face are known, we forget about our ultimate destination, briefly, and concentrate on routing the packet to the next stop along the face, which we call the "via-point".

Our shim header becomes a stack of shim headers, and we push on a new header whose destination is the via-point. The packet is now forwarded like a new packet, toward the via-point. Once the via-point is reached, the header is popped off, and the packet is ready to continue routing around the original face, having "virtually" traced the face edge that no longer exists.

Simulation Results and Evaluation

To evaluate our routing protocol we present the results of several simulations, which demonstrate the advantages of TAG compared with other geographic and MANET routing protocols. We first report the results of simulating our protocol in a theoretical square field (as in [25]), randomly placing static nodes on a plane in a square measuring 20 units on each side. Next we briefly describe a study comparing TAG and OLSR. Finally, we report results from a more realistic simulation, where mobile nodes trace the paths traveled by over 600 actual aircraft moving at hundreds of miles per hour.

Simulation Environment

We use the ns-3 [33] network simulator (version 3.21) for our evaluation experiments. We utilize the default ns-3 implementation of OLSR, and our own implementations of GFG and GOAFR+(these latter protocols are not included with ns-3). Since our goal at this stage is to measure the performance of our routing protocol without interference from the environment or other layers of the stack, we assume perfect wireless links and a collisionless MAC layer. By perfect links we assume that no packets are dropped at the link layer, and that the directional links are able to re-point and reconnect instantly. Instant reconnection could essentially be accomplished by doubling the number of links and allowing one to remain connected while its counterpart established the next connection. A collisionless MAC layer is also not so unrealistic for directional links where interference is less common given the directional nature of the connections. Further, we assume (as in [25]) that all position information required by the geometric routing protocol may be available without extra communication overhead. This includes a node's knowledge of its position and the positions of nearby nodes (nodes within the position exchange range c of 288 km or 1.44 units), as well as each source node's knowledge of the destination positions of its flows. Finally, we assume all nodes have a synchronized time reference.

Varied Density with a Static Topology

We first compare the performance of TAG, GOAFR+, and GFG on a static topology using the hop stretch metric [29]. Hop stretch is the ratio of the number of hops required by a routing protocol to reach the destination d to the number of hops on the shortest path (in terms of hops) between s and d. Lower hop stretch values imply better performance for the geographic routing protocol.

For this experiment the number of nodes is increased from a density value of 1 to a density value of 20 nodes per unit disk. A density value of five implies that on average each node will have four other nodes within communication range (within its unit disk). For reference, in this simulation the density values 1 and 20 correspond to 128 and 2547 total nodes, respectively. For each run, a source node, s, and destination node, d, were randomly selected from the simulated nodes. A single UDP packet was then sent from the selected source node towards the destination node. The number of hops taken by the simulated routing protocol was recorded, as were the number of hops in the shortest path from the source to the destination.

Figure 7:
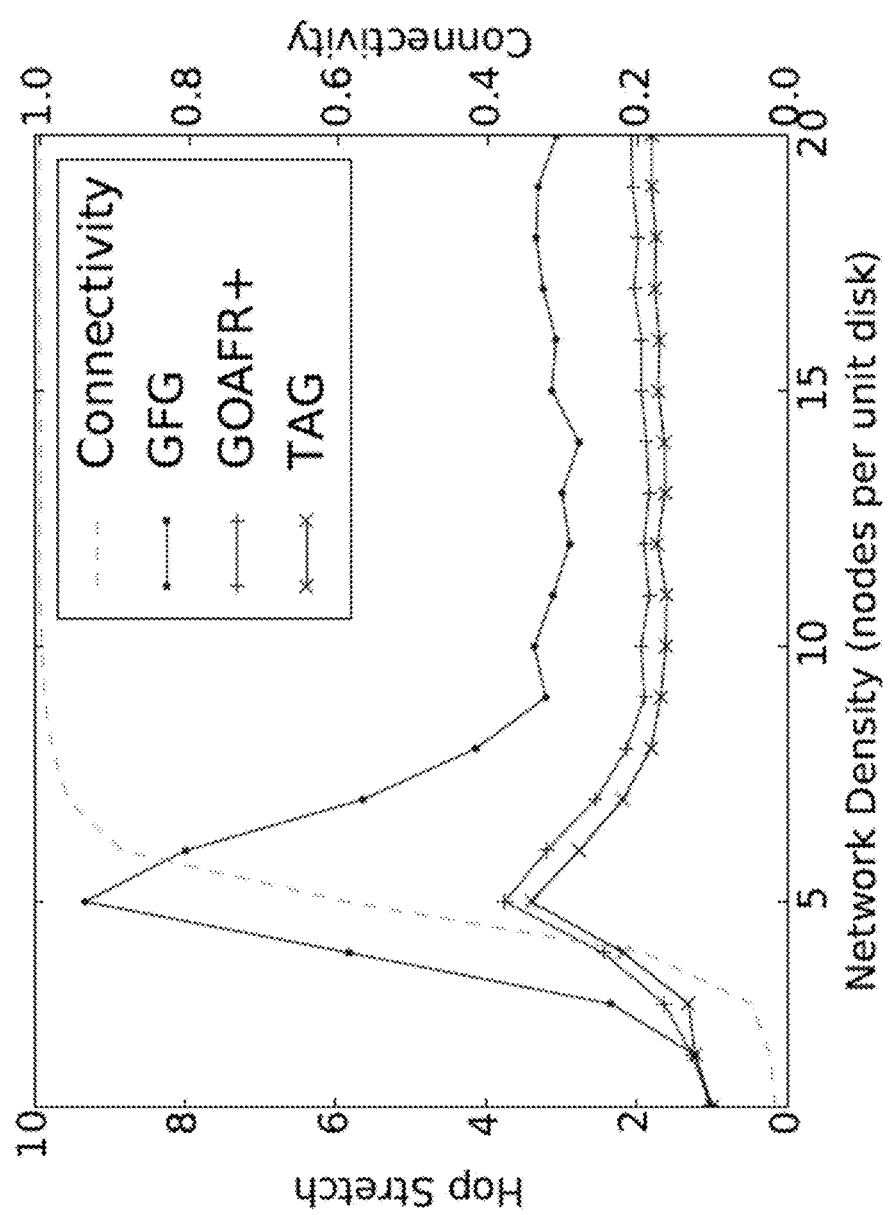
FIG. 7 depicts a plot of the resulting hop stretch values for the various protocols as node density increases.

FIG. 7 depicts a plot of the resulting hop stretch values for the various protocols as node density increases. Each point on FIG. 7 represents the mean value for 2000 trials (each with a random set of node positions and source, destination pair). Also plotted on the right axis is the connectivity of the network at the given densities. Note that below a critical density of about five nodes per unit disk the source and destination have a path between them (are connected) less than half of the time. Nodes that are able to connect to one another at these densities generally are within a few hops of one another. Hop stretch values for disconnected source/destination pairs are not included, yielding low hop stretch values for the lower densities. Once a majority of source/destination pairs are connected the hop stretch values become very large. This is because, although the nodes are connected, any path connecting them must wind its way through the "nearly disconnected" network. Finally the hop stretch values basically level off. TAG makes a slight improvement on the performance state-of-the-art GOAFR+ protocol, and performs significantly better than the basic greedy-face-greedy protocol (GFG). The mean hop stretch for TAG is 1.73, compared with 1.97 for GOAFR+ and 3.57 for GFG. This improvement is credited to the effective use of the local topology information at each node.

Comparison with OLSR

We now describe a simple experiment comparing our routing protocol with Optimized Link State Routing (OLSR) [34]. We simulate 24 mobile nodes tracing the actual paths taken by aircraft on Jul. 9, 2015. Various example implementations of a topology management protocol described herein can be used to form a topology assuming three directional links per aircraft and a maximum air-to-air link range of 200 km. The node movement and topology management are such that there may exist a topological path between every pair of nodes in the network. We simulate a low-rate (10 Kbps) UDP flow between every pair of mobile nodes in the network for 1 hour. The default Hello interval of 2.0 seconds is used for OLSR. TAG successfully delivers every packet achieving a PDR of 1.0, while OLSR is only able to successfully deliver 94.2% of the packets (a PDR of 0.942). In addition, OLSR sends over 281,000 overhead packets (a total of 53 Megabytes). Tag has no overhead besides the small additional header attached to each packet. Similar OLSR experiments with about 600 nodes have yielded PDRs as low as 0.44.

Realistic Airborne Network with Mobility

We now present results from another experiment utilizing the real mobility data of a subset of all commercial air-traffic in the United States (several hundred aircraft), and compare the performance of the chosen geographic routing protocols in this environment. The density of the network increases as the simulation progresses from 3.11 to 10.47 nodes per unit disk. In striving for perfect PDR, we do not limit the number of hops each packet may take (deactivating the IP TTL countdown).

Figure 8:
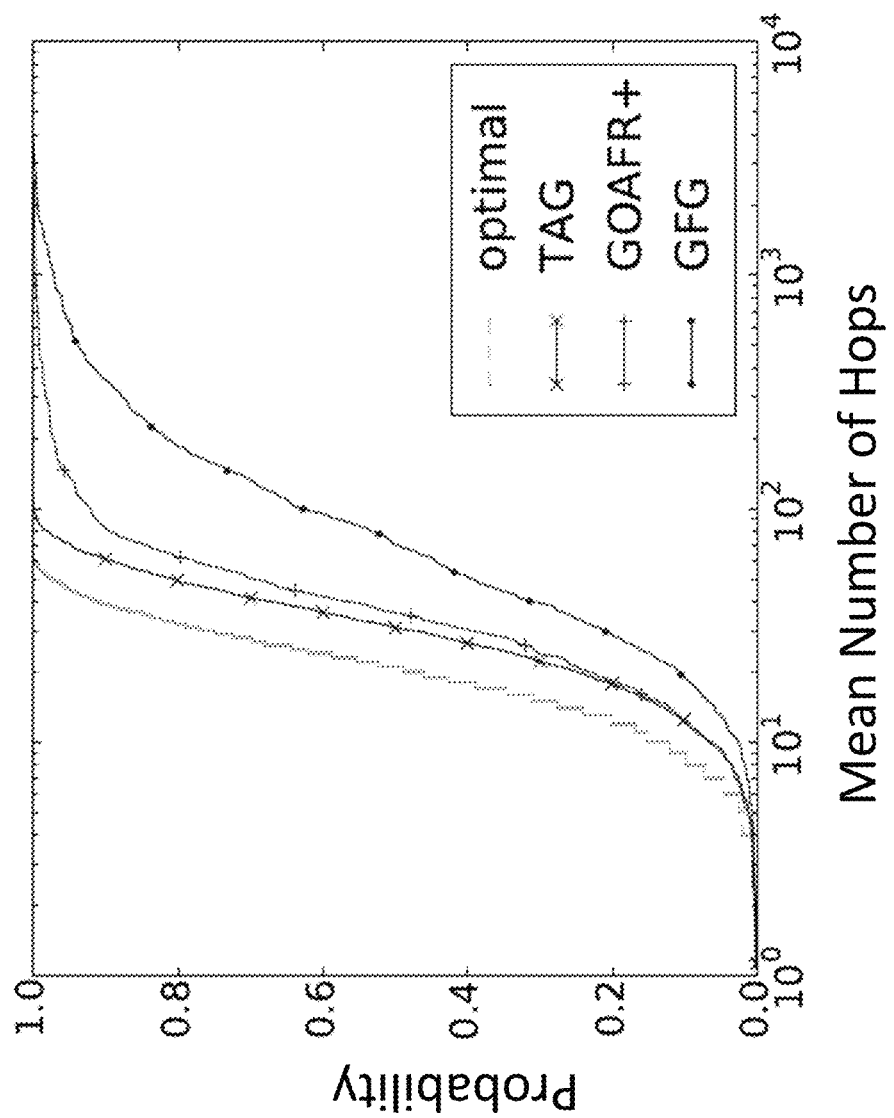
FIG. 8 depicts the cumulative distribution function (CDF) of the Mean numbers of hops for each of 1000 individually simulated flows in the network.

FIG. 8 depicts the cumulative distribution function (CDF) of the mean numbers of hops for each of 1000 individually simulated flows in the network. The curve for the optimal number of hops (given a global view of the network) is also plotted for comparison. One example TAG implementation performs better than GOAFR+, especially in the tail of the distribution, with the worst performing flow requiring only 111 hops on average for the example TAG implementation, but over 2,000 hops for GOAFR+ and nearly 3,000 hops for GFG. The high numbers of hops are a result of either cases where a packet gets stuck in a loop until the topology changes allowing progress, or cases where the basic geographic protocols make bad choices or must backtrack several times while expanding the bounding circle. Also notable, is the fact that many flows using GOAFR+ were unable to guarantee delivery, with some achieving PDRs lower than 0.96. The large numbers of hops in the worst case, highlight how helpful a small amount of local topology information can be, and the importance of supporting full mobility.

Additional Thoughts

These results are promising, but more work may be done to fully investigate TAG's performance, especially when higher-layer protocols are used. Preliminary results indicate that TCP functions well with TAG, and we hope to present more detailed results soon. We suspect that TAG's performance may still be improved upon by using probabilities to determine which direction a packet should be forwarded when even the available local topology information doesn't induce a preference. We plan to make this and other optimizations to the protocol going forward.

The subject matter described herein includes various features of TAG, a new geographic routing protocol which advances the state of the art by (1) supporting non-unit disk graph topologies, (2) using local unreliable topology information to make better geographic forwarding decisions, and (3) supporting full mobility of nodes without risk of routing loops. We detailed the routing protocol, and then presented simulated comparisons of TAG in a theoretical network, and a real-world large-scale mobile airborne network. TAG outperforms GOAFR+, GFG, and OLSR in our simulations. We envision a day when mobile ad-hoc networks will connect aircraft, spacecraft, watercraft, and vehicles, into high-capacity large-scale networks. Efficient routing protocols for these unique futuristic networks are needed, and we believe that TAG is a step towards that future.

Topology Management Introduction

The subject matter described herein includes details about a suite of distributed topology algorithms which can manage the topology of an airborne network with no inter-node communication except for periodic position exchanges. The subject matter described herein also demonstrates the effectiveness of these algorithms by simulating a continental-scale airborne network among hundreds of simulated aircraft re-tracing the flight paths of actual commercial aircraft.

Topology Control

Traditional wireless networks use omni-directional links which transmit messages in all directions. Topology control in traditional wireless networks is the notion of controlling the transmission power of nodes in order to obtain a global topology with certain properties [41]. In a wireless sensor network, for example, topology control may be used to connect a set of nodes into a global topology where power usage is minimized. When using omni-directional links the topology can only be changed by expanding or contracting the reach of their transmissions. If two neighbors are equidistant to a node, they are either both included or both excluded. We call this implicit topology control. On the other hand, when directional data links are used, a node must explicitly control which other nodes its links connect with. We label this explicit topology control or explicit topology management, which is related but distinct from most existing topology control research.

ADS-B

An example implementation of a topology management framework described herein may require nodes to periodically exchange position information. Fortuitously, commercial aircraft already frequently exchange this information via a new Federal Aviation Administration (FAA) mandated system known as Automatic Dependent Surveillance-Broadcast (ADS-B). ADS-B allows aircraft to broadcast their position information once a second to tracking systems on the ground and to all other aircraft within an approximated 288 km range. The FAA is requiring that aircraft be equipped with ADS-B, as a replacement for their existing radar systems, by the year 2020 [16], and many have already made the switch.

Geographic Routing

The topology of our proposed large-scale network is constantly changing as nodes, flying at 500 mph, often quickly move out of range of nodes that, moments ago, were nearby. Traditional routing protocols can't handle this highly-dynamic network topology, and even routing protocols designed for mobile wireless networks often struggle to deliver data [18]. We have developed a Topology Aware Geographic Routing protocol (TAG) which is able to route within these types of highly-dynamic network topologies. As a geographic routing protocol TAG uses node position information to assist with routing. Each packet has a small shim header added to it which stores a small amount of state information, including the destination location of the packet. Our protocol is a Greedy-Face-Greedy protocol which has been enhanced to route packets in dynamic non-unit disk graph topologies, while utilizing local topology information. Greedy-Face-Greedy means that the packet is forwarded greedily, to the directly connected neighbor which is the closest of to the packet's destination [21]. If the current node is the nearest of the nodes to the destination node, the packet has reached a local minimum. At this point Face routing is employed, routing around a planar face between the local minimum and the destination [22]. Once the packet is closer to the destination than where it was at the local minimum (or some other face routing early termination condition is met) it can again begin greedily routing the packet towards the destination. Because face routing is utilized, and may require a planar topology, various examples of topology management algorithms described herein may produce planarized topologies.

Gabriel Graph

Figure 9:
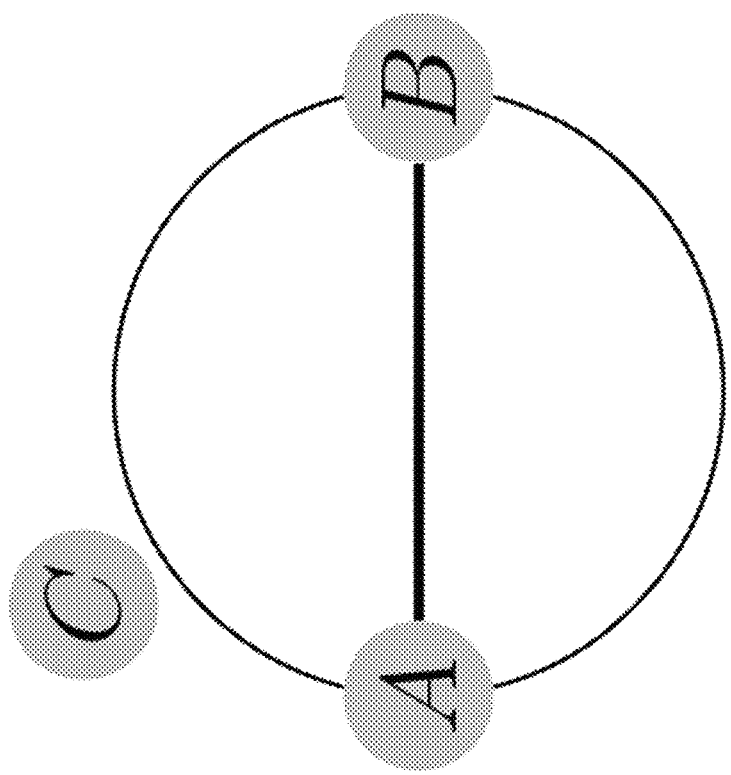
FIG. 9 depicts an example of Gabriel graph where points A and B are connected since no other vertex is inside the circle.

The Gabriel Graph is a tool we will use for creating planar topology graphs. A Gabriel Graph can be constructed among a set of points in the Euclidean plane. An edge exists between a pair of distinct points (A,B) in the set if and only if the closed disc, of which the line segment connecting them is a diameter, contains no other points in the set. FIG. 9 depicts an example of Gabriel graph where points A and B are connected since no other vertex is inside the circle. In FIG. 9, for example, the edge between A and B is a part of the Gabriel Graph since the only other known vertex (C) is outside of the circle whose radius is half the distance of $\overline{AB}$ and is centered at the midpoint of $\overline{AB}$.

Related Works

Santi gives a thorough overview of the research of implicit topology control in [41]. Works involving topology control and directional data links are harder to come by. Milner et al. have experimented with topology control in a rapidly re-configurable terrestrial free-space optical network, which produced cost effective and robust topologies [42]. In [43], Huang et al. report on their use of topology control with a sectorized directional antenna and Cone Based Topology Control (CBTC). However none of these approaches achieves the types of topologies we desire.

Tree-based Reliable Topology (TRT) [44] is a topology algorithm which we adapt for our purposes. It constructs topologies that are guaranteed to be 2-edge connected (where a graph remains connected when any single edge is removed) assuming that the original graph was at least 2-edge connected. LTRT [32] is a localized version of TRT, and is similar to our topology management framework. Neither TRT nor LTRT produce topologies sufficient for our task, as they do not constrain the degree of the nodes in their topologies.

Several military airborne networking research projects have developed airborne network topologies, though generally at much smaller scales than the networks we model. In Mission Aware Topology Control (MAToC), for example, nodes generate a time dependent topology from flight path information shared between them [45], and in [46] a Mobility Aware Routing Protocol is described and results of simulating it in a small military airborne network are presented.

Explicit Topology Management Framework

An example topology management framework described herein may require that every node regularly exchange position information with every other node in its community (every node within a given range). This is the only communication overhead of the framework, and this information may already be available in some applications (as is the case in our example application of commercial aircraft using ADS-B). Periodically each node independently uses a topology algorithm to compute a local topology that connects the nodes in its community. Each node then seeks to form the connections of which it is a part in the resulting topology.

In some embodiments, a local topology computed by each node can be thought of as a node's 'opinion' of what the network topology should look like given its limited view of the world. Nodes located geographically close to one another will share nearly the same view of the world and have comparable community members. There is a high probability that their computed topologies (their opinions) will thus be very similar, if not identical, and if one node believes it should connect to the other, the other will likely reciprocate, establishing the connection without any handshake or extra communication overhead. However, if nodes are further apart, it is more likely that differences in the communities of the two nodes will lead to a difference of opinion as to what the local topology should look like. In these situations it is possible for one node to attempt to establish a connection, while the node it is pointing at intentionally points at different neighbors (as specified by its local topology), yielding a one-way connection. These errors are the 'cost' of the distributed topology management framework. The choice of topology algorithm can affect how often these errors occur, and how often nodes are disconnected from the network. If an appropriate topology algorithm is employed, and the density of nodes is high enough, the result is an acceptable global topology. Most importantly, this framework is extremely scalable, easily coping with tens of thousands of nodes, and adaptable, able to rapidly respond to joining, leaving, or fast moving nodes.

Topology Algorithms

The effectiveness of the topology management framework outlined above hinges on the selection or design of an appropriate topology algorithm. The topology algorithm takes a set of nodes and their positions, and specifies a set of connections between the nodes. Candidate topology algorithms must produce a topology graph where the degree (number of incident edges) of each vertex is at most the number of links on the associated node. Further, for our airborne network application we insist that each topology graph also be a planar graph, to facilitate our geographic routing protocol. Any candidate algorithm must also be able to compute topologies quickly and have relatively low computational complexity. In addition, there are several desirable properties of a good topology algorithm candidate.

First, and perhaps most importantly, the topology algorithm should have high inclusion, connecting as many of the nodes as possible into a single connected component. Next, and also very important, a suitable candidate algorithm should seek to minimize the number of hops between every pair of nodes in the network. Doing so will help ensure efficient routing. Finally, to the extent possible, the algorithm should form robust topologies where multiple paths exist between pairs of nodes, where one-way connections are few, and where link utilization is high.

Designing an algorithm which meets all these constraints can be tricky. One may initially consider using Kruskal's or Primm's algorithm to compute a minimum spanning tree (MST) among the nodes, which would lead to a high level of inclusion, but the lowest level of robustness as removing any edge would disconnect the graph. More importantly, the traditional minimum spanning tree problem is not degree-constrained, and adding a degree constraint makes it NP-hard [47]. Tree-based reliable Topology (TRT) [44] is a topology algorithm which preserves connectivity and robustness, but unfortunately it also does not constrain the degree. In general, effective topology algorithms must balance the trade-offs among several characteristics. For example, including long edges in the topology graph results in topologies with lower average hop counts when routing in the network, but long edges also lead to a higher occurrence of one-way connections. Similarly, better connectivity could sometimes be obtained but at the cost of a huge increase in computational complexity. The goodness of a topology has a huge impact on the efficiency of routing packets through it, and seemingly insignificant changes to an algorithm can yield a network that is significantly more optimal or one that is a complete failure.

Figure 10:
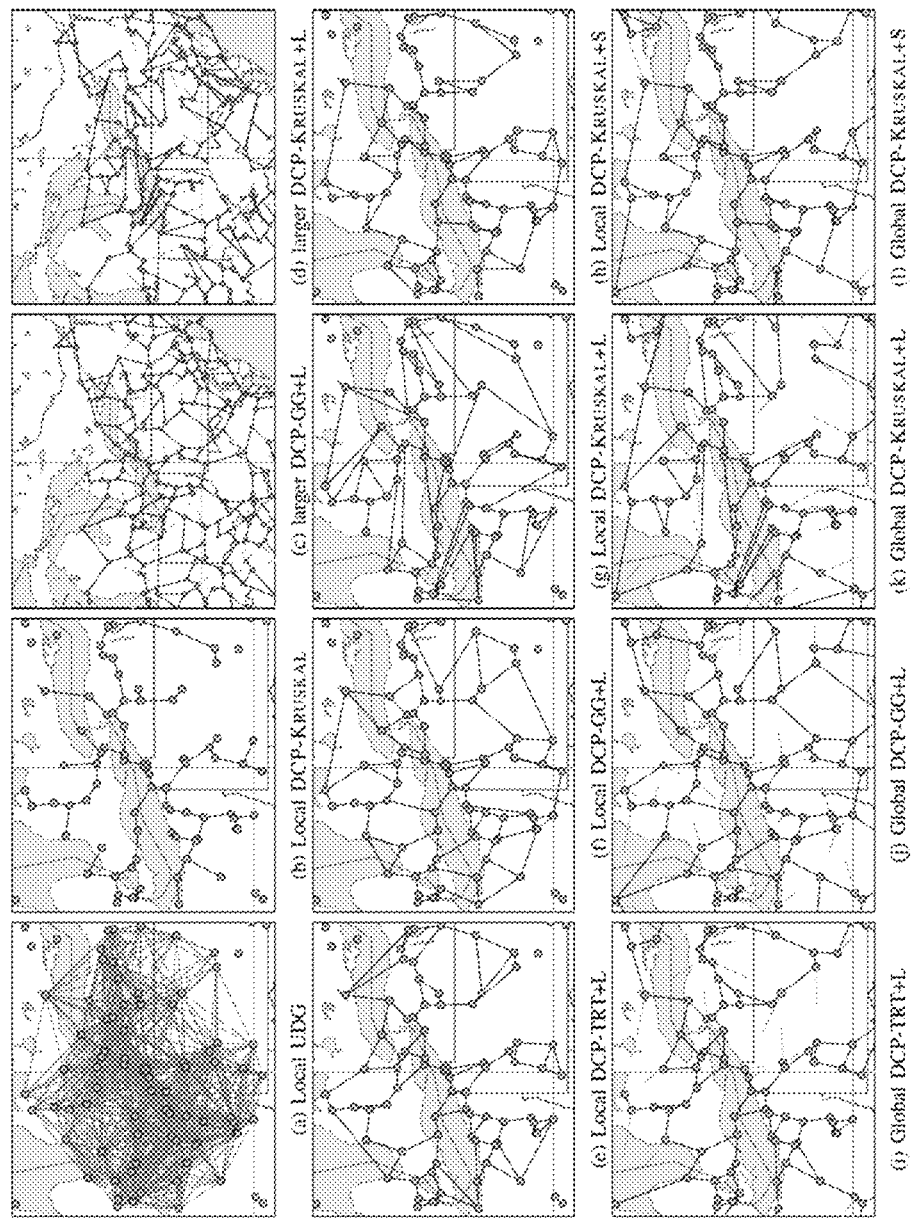
FIG. 10 depicts local and global topology graphs for various topology algorithms including some graphs for comparison.

We have designed and experimented with several topology algorithms which meet the requirements described above. FIG. 10 depicts local and global topology graphs for various topology algorithms including some graphs for comparison.

Each candidate algorithm will be discussed below. The main input to each of these algorithms is a potential connections graph, which is a unit disk graph of the set of nodes, where connections exist between any two nodes whose separation distance is less than some maximum range. In FIG. 10, topology graph (a) shows a graph for a set of nodes which we will use to study the algorithms. The positions for these nodes are obtained from an FAA Aircraft Situation Display to Industry (ASDI) dataset and represent the positions of actual aircraft on Jul. 9, 2015 at 2:45 p.m. CT flying over the great lakes region of the northern United States. The connected nodes are all within 288 km (the position exchange or community range) of the central node (the node that would be calculating the topology for this set of nodes). The few disconnected nodes which appear in the corners of the local plots and are further than 288 km from the central node and are not included in the local topologies.

Degree-Constrained Planar Kruskal

FIG. 11 depicts a function or method for a DCP-Kruskal algorithm. While DCP-Kruskal is not a great topology candidate by itself, because of its lack of robustness, it is a useful subroutine for three of the candidate algorithms. This algorithm is basically an augmented version of Kruskal's original Minimum Spanning Tree algorithm. Initially a vertex set is created for each vertex in the input graph, where each set initially contains a single item, the associated vertex. In addition an array is created to hold the number of incident edges (degree) at each vertex, and each value is initialized to 0. The edges of the input graph are then sorted by length (or weight), such that the smallest are first. For each edge in the sorted list, if (1) the vertices it connects are not already in the same set, (2) both vertices it connects have fewer than the maximum number of incident edges, and (3) the edge being considered does not intersect any edge in the list of edges to return (A), then the edge is added to A, the sets of both vertices are combined, and the number of incident edges at the vertices is incremented.

This seemingly minor change is detrimental to the properties of the minimum spanning tree, and the resulting graph no longer always spans a connected input graph, nor is the resulting graph always the minimum of the graph's spanning trees. Despite these facts, we find DCP-Kruskal to be a helpful and efficient subroutine used by many of our other topology algorithms. In FIG. 10, topology graph (b) shows the result of computing the DCP-Kruskal of the set of nodes being studied. Notice that none of the nodes in the resulting graph have more than three incident edges.

Degree-Constrained Planar TRT Plus Long

FIG. 12 depicts a function or method for a degree-constrained planar tree-based reliable topology plus long (DCP-TRT+L) algorithm. The DCP-TRT+L algorithm is an adapted version of the Tree-based Reliable Topology (TRT) algorithm. The algorithm has been modified to ensure degree and planarity constraints are honored. In addition, since TRT doesn't attempt to form all viable connections, we augment the algorithm by adding any remaining viable edges, longest first, to the graph as a final stage of processing. DCP-TRT+L seeks to form a topology that is robust by concatenating two levels of minimum spanning trees. First DCP-Kruskal is called on the input graph (G), and the resulting graph's (T's) edges are removed from the input graph. Next, with these edges removed the graph is passed to DCP-Kruskal and the result is U. Each edge of U is then added to T, longest first, unless adding the edge would cause a vertex to have more than the prescribed number of incident edges (violating the degree constraint), or the edge would cross one of the edges already in T (violating the planarity constraint).

Note that if a vertex in the resulting topology graph has a degree less than the maximum degree, either the topology algorithm didn't utilize all viable edges, or it is impossible to add an edge to the node without (1) it raising another nodes degree above the maximum degree, or (2) it crossing an edge already in the graph. Thus, as an optimization we introduce the ADDEDGES function.

FIG. 13 depicts a function or method known as ADDEDGES that essentially finds any viable connections which were not yet utilized by a particular topology algorithm, and adds them to the final topology. The order in which these edges are considered for addition makes a difference, since the addition of an edge can eliminate other candidates from consideration if they share a common vertex or intersect. The function can consider edges in the longest first (Plus Long, +L) or shortest first order (Plus Sort, +S). Since the topology management framework, using the results of the Topology algorithm calculation, may ultimately only act upon the connections incident at the node calculating the topology, its links may take precedence. The node parameter communicates which node is calculating this topology, and the function first adds edges incident at this node, before considering other edges.

In FIG. 10, topology graph (e) shows the topology computed by the DCP-TRT+L algorithm for the set of aircraft flying over the great lakes region. Notice that the algorithm generates a topology which has multiple paths between most pairs of nodes, but fails to include some of the potentially beneficial longer links at the edge of the topology.

Degree-Constrained Planar Kruskal Plus Long

The DCP-Kruskal+L algorithm uses the DCP-Kruskal algorithm and then calls ADDEDGES with the parameters set such that longest edges are added first. The MST algorithm seeks to span the nodes (and honor the degree and planarity constraints) while the AddEdges function adds robustness, and shorter paths between pairs of nodes. For comparison with the other algorithms, in FIG. 10, topology graph (g) shows the topology computed by this topology algorithm. Notice how long most of the edges are, and how the faces formed are sometimes very long and narrow, like shards of glass.

Degree-Constrained Planar Kruskal Plus Short

Similarly, the DCP-Kruskal+S algorithm uses the DCP-Kruskal algorithm and then calls ADDEDGES with the parameters set such that shortest edges are added first. Since two nodes which are far apart are more likely to disagree on what the topology should look like, long edges are more likely to become one way connections. This algorithm avoids longer edges by adding the shortest edges first after DCP-Kruskal is called. Fewer one way connections, and more link utilization can be expected from this algorithm, but at the cost of longer paths. Displayed in FIG. 10, topology graph (h) is the topology formed from the studied set of nodes by this algorithm.

Degree-Constrained Gabriel Graph Plus Long

Figure 14:
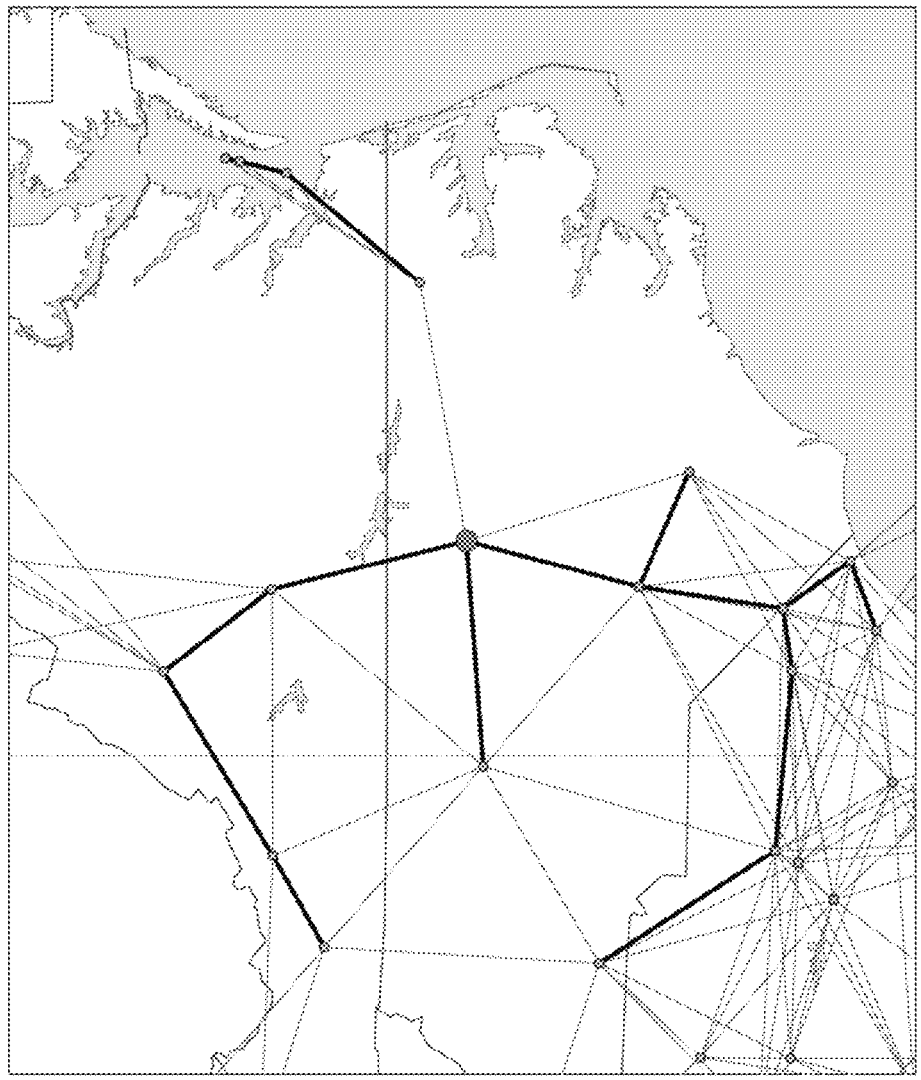
FIG. 14 depicts a disconnected topology computed with DCP-Kruskal.

FIG. 14 depicts a disconnected topology computed with DCP-Kruskal. Thin lines represent potential connections and thick lines the connections in the topology. When the number of incident edges at a vertex reaches the limit, the DCP-Kruskal algorithm can sometimes disconnect nodes from the graph, even though a small link change and a small increase in the weight of the spanning tree could allow them to be included. See, for example, FIG. 14 where DCP-Kruskal has generated a topology among several nodes flying over Virginia and North Carolina. Thick lines represent the computed topology and thin lines are seen anywhere a connection could potentially be formed (separation distance of nodes is less than the maximum range of 200 km). Unfortunately the topology graph is disconnected and several nodes on the right-hand side of the figure are not connected to the larger connected component on the left. Note that the larger node has reached its maximum number of incident edges (3), and it is the only node which is capable of connecting to the nodes on the right. Note also that it is using one of its links to connect with the node to its left which has six other nodes to which it could connect (though the formed connection is the shortest).

The degree-constrained spanning tree (DC-ST) algorithm seeks to overcome this problem by identifying situations like this and adjusting the connections such that connectivity trumps the lengths of the connections. It first calls Kruskal's MST algorithm, and then identifies which nodes in the resulting graph have a degree higher than the maximum allowed. For each node whose degree is too high, the nodes at the other ends of its connections are identified, and among those nodes the one with most potential connections is identified and the edge to it is removed from the set of potential connections. The expectation is that that node will likely be able to remain connected using one of the other potential connections. A new MST is generated with fewer edges, and we iterate until all nodes honor the degree constraints.

The DCP-GG algorithm forms a Gabriel Graph among the set of nodes, then uses the DC-ST algorithm (just described) to intelligently constrain the degree of the Gabriel Graph.

The DCP-GG+L algorithm calls DCP-GG, and then finally uses ADDEDGES to add any additional edges, longest first, to the topology.

Topology Algorithm Comparisons

In FIG. 10, topology graphs (i)-(l) display the results of the topologies obtained using each of the topology algorithms to compute a global topology graph in a distributed manner. Topology graphs (c) and (d) show zoomed out versions of the respective topologies. One-way connections are displayed as light (yellow) lines which extend half-way to their intended target. Because there is no explicit communication or agreement between the nodes about forming connections, nodes that have a different 'opinion' about what the topology should look like than their neighbor may find that their link is pointing to a neighbor which is using its links to point elsewhere, resulting in a one-way connection. As long as there are redundant paths in the network and nodes remain connected, one-way connections aren't terrible, but too many could cause problems.

Notice the differences between the local topologies and the global topologies formed among the same nodes. One other factor that affects the routing of packets within the network is the size of the faces in the planar topology. If the source and destination of a packet were on opposite sides of a large face (like the face in the bottom right corner of topology graph (I) in FIG. 10) the number of hops the packet must travel over is large. If, however, faces are smaller (as in DCP-GG+L in topology graph (j) in FIG. 10), the number of hops required for a packet to travel between the same pair of nodes can be significantly less. Notice that DCP-Kruskal+S has fewer one-way connections than the other algorithms. This is because so many of its connections are short, decreasing the likelihood that nodes will have a difference of opinion on what the topology should look like.

For a more complete view of the performance of these algorithms we now present a detailed analysis of several key properties of the topology graphs for a many sets of nodes of various densities. For each experiment we select a date and time at random within a 15-day time period. Aircraft (excluding general aviation flights) flying above 10,000 feet and within the continental United States at the selected time are then randomly selected until the correct mean density value is reached. If there are not enough aircraft (nodes) available at the chosen time, a new random time is selected and the process repeats. Each node (in the set of potentially thousands of nodes) then determines which nodes are in its community (within 288 km) and the potential connections graph (UDG) for this set of nodes is determined. The nodes then independently run each of the candidate topology algorithms on the potential connections graph to obtain a local topology graph at this node for each algorithm. Once all of the nodes have computed their local topology graphs these graphs are combined, simulating which links would form if the topology management framework were using each of the topology algorithms, and producing a global topology graph for each candidate algorithm. Next, 100 pairs of nodes are randomly selected, and the shortest path between them (if it exists) is measured. Finally the positions of the same set of nodes one second later are determined and these positions are used to re-compute all the topologies and analyze another 100 shortest paths. We run this experiment 750 times (50 random samples per day), so that each point is the mean of 1500 topologies of that density (2 topologies, 1 second apart per experiment) or 150,000 paths through topologies of that density.

Figure 15:
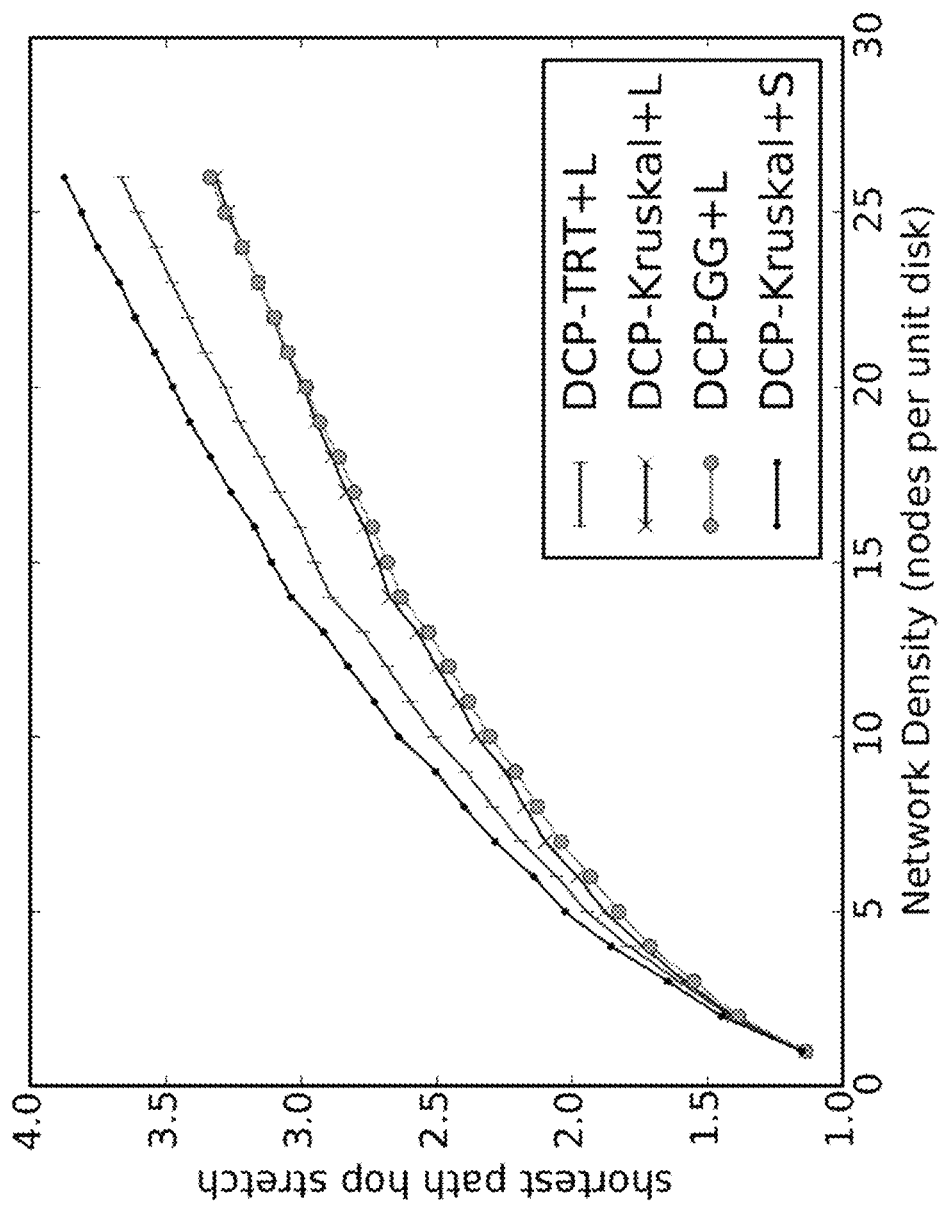
FIG. 15 depicts the ratio of the length (in hops) of the shortest path in each algorithm to the shortest possible path (in the unit disk graph)

FIG. 15 depicts the ratio of the length (in hops) of the shortest path in each algorithm to the shortest possible path (in the unit disk graph). From our experience the number of hops can have a significant impact on the routing efficiency of the network. Notice that DCP-GG+L forms the shortest paths until a density of about 22 nodes per unit disk, after which DCP-Kruskal+L performs slightly better. The intuition about why this ratio continues to rise as the density increases is that because density, area, and communication range are held constant, nodes have no choice but to break a connection with a one-hop neighbor, inserting a new node in between, and changing the previous neighbor into a two-hop neighbor, increasing the hop counts. Note also from the graph that DCP-Kruskal+S performs the worst given its preference for short connections.

Figure 16:
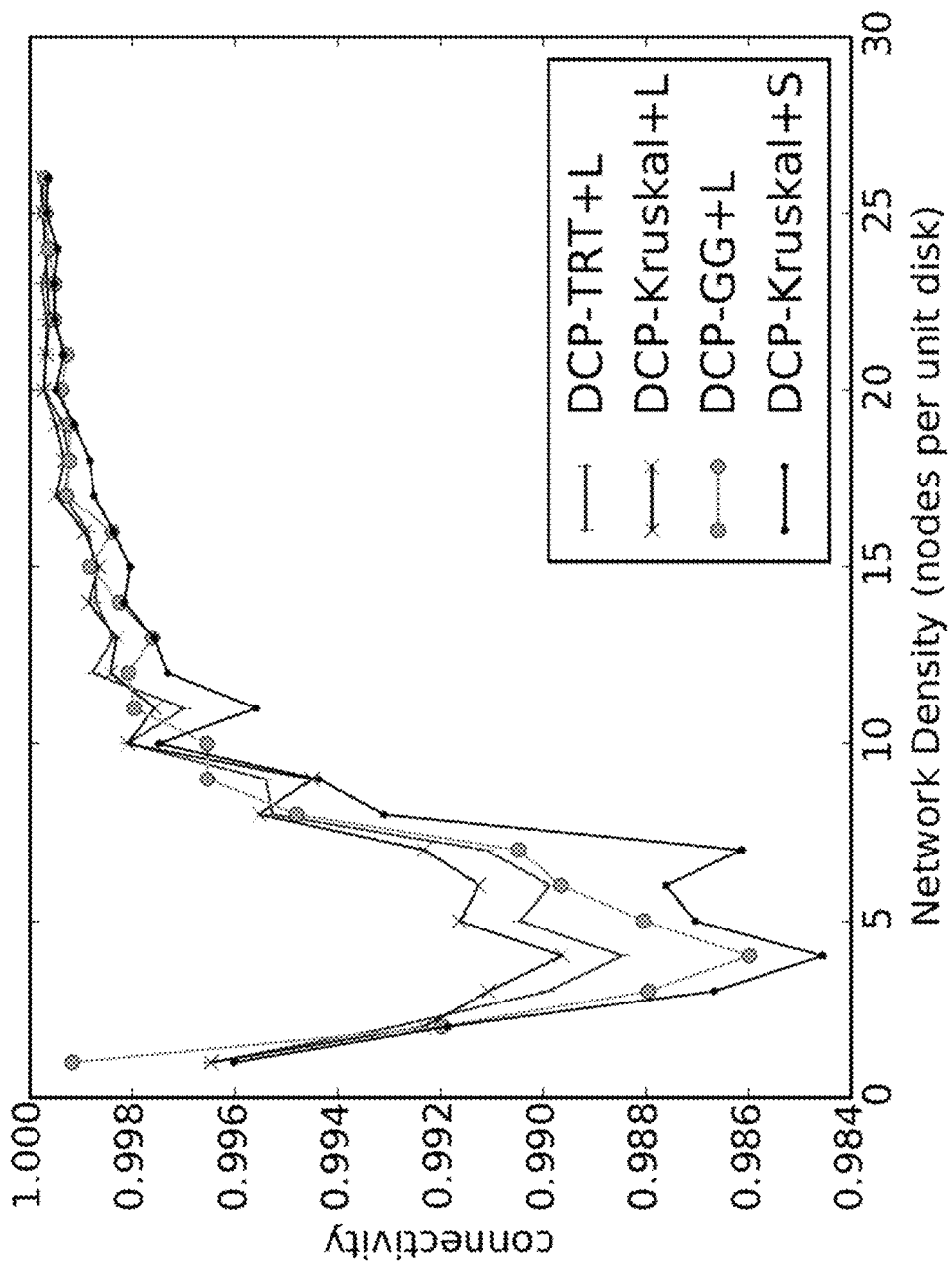
FIG. 16 depicts the mean ratio of the number of sampled node pairs connected with the given topology algorithm to the number connected in the unit disk graph.

FIG. 16 depicts the mean ratio of the number of sampled node pairs connected with the given topology algorithm to the number connected in the unit disk graph. Perhaps the graphs with the most variance is that in FIG. 16 which plots a measure of connectivity. We define the connectivity to be the mean ratio of the number of sampled node pairs connected with a path in the given topology to the number for which a path exists (in the unit disk graph). A perfect topology algorithm would always provide a path when one exists (1.0), however, the added degree constraint and planarity constraint make this difficult (if not impossible) to achieve. Note that above a density of about 8 nodes per unit disk (515 nodes) the number of nodes disconnected is less than 1% for all algorithms (numbers of nodes usually in the single digits). DCP-Kruskal+S again performs worst, as its focus on short edges causes it to miss opportunities to maintain connectivity with nodes which otherwise are disconnected. DCP-GG+L seems to perform slightly worse than the other two Kruskal-based algorithms. The benefits of DC-GG+L may, however, offset this cost.

Figure 17:
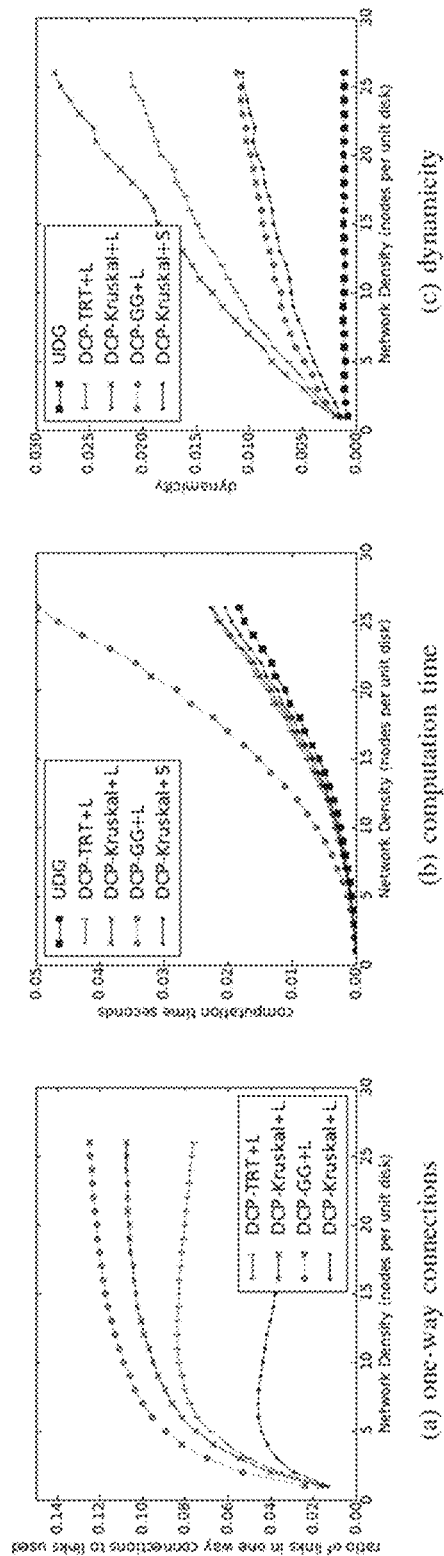
FIG. 17 depicts graphs (a)-(c), each graph showing various properties of some topology algorithms across various densities.

FIG. 17 depicts graphs (a)-(c), each graph showing various properties of some topology algorithms across various densities. The ratio of one way connections to links pointed is plotted in graph (a) of FIG. 17. DC-GG+L creates the largest ratio of one way connections, however it also uses the highest percentage of links of any of the algorithms. It may be possible to improve the algorithm to avoid some of these one way connections in the future. Interestingly for DCP-Kruskal+L and DCP-TRT+L the ratio of one way connections decreases as the density increases. This is likely because as the density increases the connection distances decrease, which decreases the probability of one way connections.

In FIG. 17, graph (b) depicts the mean number of seconds needed to compute a local topology on a single Intel Xeon Processor (E5-2637 v2). You can see that the optimizations of the DCP-GG+L algorithm aren't free, and have a significant computational cost. However, even for 26 nodes per unit disk (over 1600 total nodes) that computation time is under 50 milliseconds on average. It is likely that the implementations of these algorithms could be optimized further.

In FIG. 17, graph (c) depicts the ratio of edges which change (are added or removed) when the toplogy is recomputed after 1 simulated second. It is anticipated that this metric may be important once the time to establish connections is accounted for (for now we assume links can instantly re-point and connect). Roughly a dynamicity value of 0.01 equates to a link re-pointing about once every 100 seconds There may be no clear best algorithm, though it seems that DCP-GG+L forms good topologies if the extra computation time and a small decrease in connectivity is acceptable. DCP-Kruskal+L also performs well in terms of path lengths and connectivity, though it suffers from higher dynamicity, and large sometimes awkward faces in the topology graph.

Simulation Results and Evaluation

Results of simulating each of the topology algorithms in a network of hundreds of aircraft flying real routes are presented below. Using ns-3 [33], 1000 simultaneous low-rate flows are simulated through our network which grows as nodes join over the course of one hour to over 500 nodes. These nodes were selected to ensure that they were connectable by all of the studied topology algorithms. For the simulation we assume that links can instantaneously re-point, and that nodes have a synchronized time source. Table 3 lists the pertinent simulation parameters.

TABLE 3

| Area | continental United States plus an approx. 200 km border |
|---|---|
| Topology Update Interval | 1 second |
| Position Exchange Interval | 1 second |
| Max Transmission Range | 200 km |
| Max Position Exchange Range | 288 km |
| Data Links per node (degree) | 3 |
| UDP Flow Rate | 10 Kbps |
| number of UDP flows | 1000 |
| time simulated | 1 hour |
| Total bytes transmitted | 1.43 GB |

Table 4 lists the mean and median number of hops traveled by the 2.65 million packets routed over each of the 1 hour simulations (1 for each topology algorithm). We find that DCP-GG+L performs best with the lowest number of hops. This is consistent with our analysis above, although we suspect DCP-Kruskal+L may have performed better in a more dense network.

TABLE 4

|  | mean Hops | median Hops |
|---|---|---|
| DCP – GG + L | 21.58 | 19 |
| DCP – TRT + L | 27.31 | 23 |
| DCP – KRUSKAL + L | 28.21 | 24 |
| DCP – KRUSKAL + S | 28.95 | 24 |

Additional Thoughts

Our search for an appropriate topology algorithm has not been exhaustive, and it is possible that a better algorithm exists or can be achieved by tweaking or combining some of the algorithms presented here. We plan to continue this quest.

There are some inherent timing concerns with regards to receiving position updates, and calculating and pointing links. We feel that effective position extrapolation, buffering, and perhaps recalculating topologies more often, or on demand can address these concerns, and we hope to be able to address these more fully in the future. Also, more extensive simulations of our routing protocol and topology management framework are in order, and are currently underway. Preliminary results are promising, and we hope to present more detailed results on TCP flows and larger numbers of nodes soon.

The subject matter described herein includes details regarding an explicit topology management framework capable of connecting a large set of highly-mobile nodes into a planar degree-constrained topology in an efficient fully-distributed manner such that only node positions need be communicated between nodes. Four candidate topology algorithms were described and analyzed using large sets of real aircraft positions. These topology algorithms were also tested in a network simulator where a geographic routing protocol described herein (e.g., a TAG implementation) routed data through the networks. The results indicate that DC-GG+L routes packets in the shortest number of hops, but it is uncertain whether the slightly lower connectivity level of this algorithm will cause issues. We hope that these algorithms can help provide the thrust necessary to make large-scale high-capacity airborne networks a reality in the not too distant future.

Figure 18:
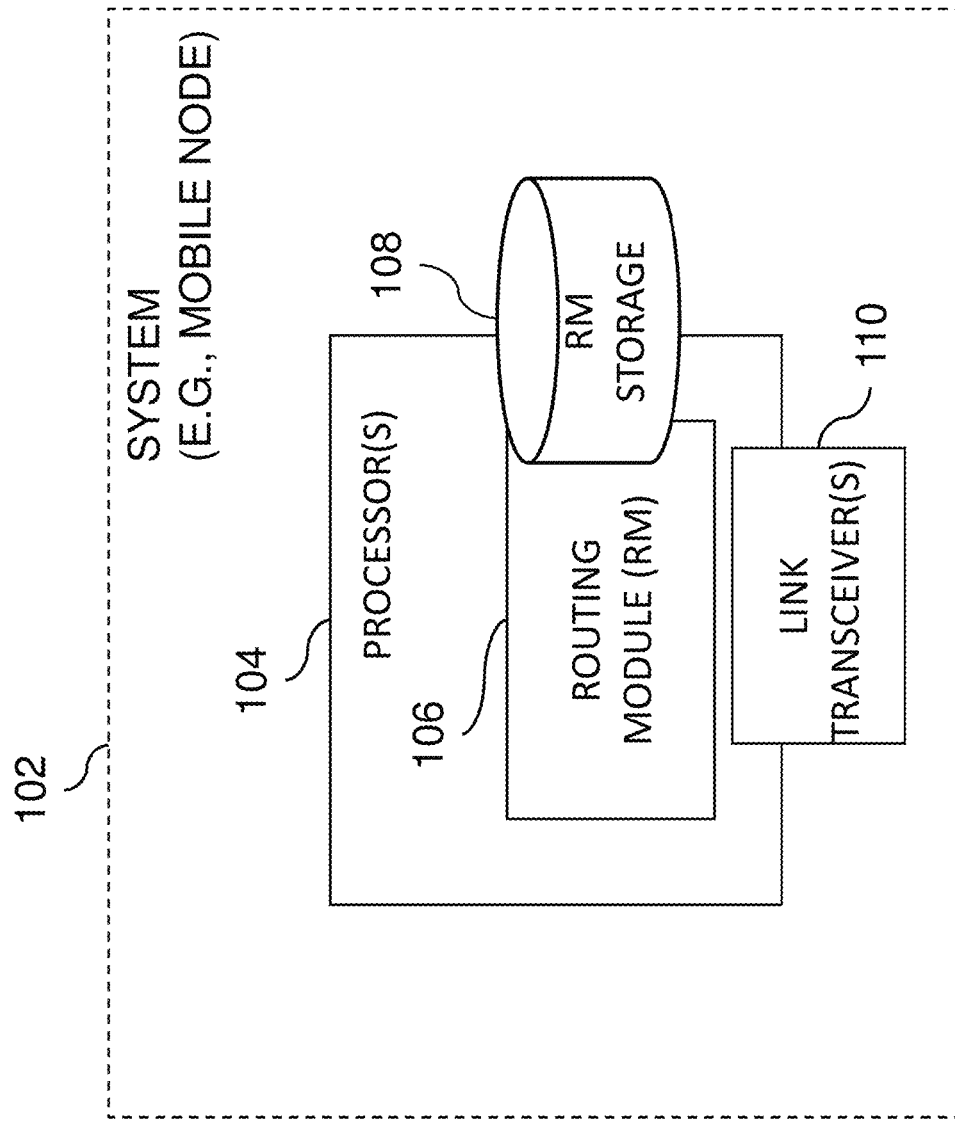
FIG. 18 is a diagram illustrating an example system for topology management and geographic routing in mobile ad-hoc networks according to an embodiment of the subject matter described herein.

FIG. 18 is a diagram illustrating an example system 102 (e.g., a single or multiple processing core computing device) for topology management and geographic routing in mobile ad-hoc networks according to an embodiment of the subject matter described herein. System 102 may be any suitable entity, such as one or more computing devices or platforms, for performing topology management and/or geographic routing. In some examples, system 102 may represent a communications device (e.g., a router and/or transceiver), a computing platform, or a node attached to an aircraft, a high-altitude balloon, or a satellite. In some examples, system 102 may include one or more free-space optics (FSO) transceivers and/or one or more RF transceivers for communicating data (e.g., packets, messages, etc.). In some examples, system 102 may communicate with other similar systems as part of a large-scale (e.g., continental-scale) mobile network.

In some embodiments, components, modules, and/or portions of system 102 may be implemented or distributed across multiple devices or computing platforms. For example, system 102 may involve multiple computers configured to perform various functions, such as performing topology management, packet routing, transceiver functions, position data broadcasting and related data gathering, link related aiming or adjustments, and/or other functions.

In some embodiments, system 102 may include one or more processor(s) 104, a routing module (RM) 106, an RM storage 108 and one or more link transceiver(s) 110. Processor(s) 104 may represent or include a physical processor, a general purpose microprocessor, a single-core processor, a multi-core processor, a field-programmable gate array (FPGA), and/or an application-specific integrated circuit (ASIC). In some embodiments, processor(s) 104 may be configured to execute software stored in one or more non-transitory computer readable media, such as RM storage 108 in system 102. For example, software may be loaded into a memory structure for execution by processor(s) 104. In some embodiments, e.g., where system 102 includes multiple processors, some processor(s) 104 may be configured to operate independently of other processor(s) 104.

RM 106 may be any suitable entity or entities (e.g., software executing on processor(s) 104, an ASIC, an FPGA, or a combination of software, an ASIC, or an FPGA) for performing one or more aspects associated with topology management and/or geographic routing in mobile networks. In some embodiments, RM 106 may be implemented using processor(s) 104 and/or one or more memories, such as RM storage 108. For example, RM 106 may utilize processor(s) 104 (e.g., using software stored in local memory) and random access memory (RAM).

In some embodiments, RM 106 may include or utilize one or more communications interfaces, e.g., one or more network interface cards (NICs), for interacting with various computers and/or other devices. For example, RM 106 may use one or more communications interfaces for receiving and sending various types of data units; such as Internet protocol (IP) messages, Ethernet frames, Ethernet messages, or packet data units (PDUs). In another example, RM 106 may utilize application programming interfaces (APIs) and/or graphical user interfaces (GUIs) to receive or obtain settings and/or configuration information for adjusting various topology management and/or routing related features.

In some embodiments, RM 106 may use one or more communications interfaces for receiving and/or sending position information (e.g., geographic position information, global positioning system (GPS) coordinates, etc.) associated with system 102 or other similar systems. In some examples, position information from various nodes may be received via ADS-B. In such examples, RM 106 may use the position information to generate or determine a local topology and may use this information or for topology management and/or routing related decisions.

In some embodiments, RM 106 may include functionality for storing historical data about nearby nodes. For example, as mobile nodes move and new node position information is obtained (e.g., via ADS-B), RM 106 may attempt to identify nearby nodes so as to determine whether current links are still operational, determine whether to move or adjust link to optimize or improve an existing connection, or determine whether to move or adjust link to move to another node. In this example, RM 106 may use a data structure (e.g., buffer in RAM) to store information about nodes that are directly connected to system 102 at any given time within a particular time frame (e.g., the last five seconds).

In some embodiments, RM 106 may utilize one or more geographic routing algorithms and/or protocols for routing messages in a dynamic mobile network. For example, RM 106 may utilize a topology aware geographic routing algorithm, such as the TAG implementation that includes a greedy-face-greedy algorithm utilizing a bounding circle. In another example, RM 106 may utilize a topology aware geographic routing algorithm that includes one or more features associated with TAG described herein.

In some embodiments, RM 106 may utilize one or more geographic routing algorithms and/or protocols that provide non-unit disk topology support. For example, a geographic routing algorithm that provides non-unit disk support may check for intersections to determine when face routing should be restarted at the current node. In this example, the routing algorithm may perform face routing such that as a message moves around a face boundary, each node may determine whether, in a projection of the nodes and connections onto a 2-dimensional plane, a line segment that represents the projection of a next edge to be traversed intersects the projection of a line segment extending from a face start position to the destination position, and in response to detecting an intersection, restarting face routing, where the node at which the intersection is detected becomes the face start position when the face routing is restarted.

In some embodiments, RM 106 may utilize one or more geographic routing algorithms and/or protocols that use local unreliable topology information to make better geographic forwarding decisions, e.g., during face routing. For example, at a given node, a geographic routing algorithm may use an available local topology graph to find and return an identifier of the node nearest the destination to which there is a path from this node. In this example, the geographic routing algorithm may use the nearest node identifier and determine which direction (e.g., counter-clockwise or clockwise) face routing should proceed to efficiently reach the nearest node. Continuing with this example, the geographic routing algorithm may also determine which node on the path to the "nearest" node is furthest from the packet's destination and may use that distance as the radius value for the bounding circle, thereby ensuring that the expected path can be traveled without increasing the radius.

In some embodiments, RM 106 may utilize one or more geographic routing algorithms and/or protocols that support full mobility of nodes without risk of routing loops. For example, RM 106 may utilize snapshots when face routing for dealing with topology changes. In this example, RM 106 may take a snapshot of a face (in a distributed manner) each time a packet begins tracing a face boundary. Continuing with this example, a geographic routing algorithm may use the snapshot, not the potentially changed current topology, for determining how to forward the packet around the face.

In some embodiments, RM 106 may use a time value from a packet or message header to determine which snapshot to use when face routing. For example, every node may store in a data structure the positions and IDs of nodes they have recently (in the last few seconds) been directly connected to. In this example, RM 106 may determine where to forward a packet as it travels around a face by using the time stored in the packet to look up the IDs and positions of nodes it was connected to at the given time and may then make the routing decision it would have been made at the time the face routing began (e.g., at the time that the virtual "snapshot" was taken).

In some embodiments, RM 106 may utilize one or more geographic routing algorithms and/or protocols that allows a packet to be routed to any node whose position and identifier are known even if the node is no longer connected to a current node. For example, RM 106 may add a new header to a packet. In this example, the header may indicate a next node or via-point as its destination. Continuing with this example, RM 106 may forward the packet toward the via-point and once the via-point is reached, the header is popped off, and the packet is ready to continue routing around the original face, having "virtually" traced the face edge that no longer exists.

In some embodiments, RM 106 may utilize one or more topology management algorithms and/or protocols that provide explicit topology management framework capable of connecting a large set of highly-mobile nodes into a planar degree-constrained topology in an efficient fully-distributed manner such that only node positions need be communicated between nodes. For example, RM 106 may be configured for creating planar topology graphs and using one or more degree-constrained planar based topology management algorithms for creating connections between nodes.

In some embodiments, RM 106 may communicate or control with link transceiver(s) 110 for adjusting, aiming, connecting, or disconnecting one or more directional wireless communications links. Link transceiver(s) 110 may represent any suitable entity or entities (e.g., software executing on processor(s) 104, an ASIC, an FPGA, or a combination of software, an ASIC, or an FPGA) for performing one or more aspects associated with communicating using a directional wireless communications link. In some embodiments, link transceiver(s) 110 may include FSO and/or RF related components (e.g., a laser or RF signal modulator) for sending and/or receiving data communications.

RM storage 108 may be any suitable entity or entities (e.g., one or more memory devices) for storing information associated with topology management and/or geographic routing. For example, RM storage 108 may store one or more routing algorithms, one or more topology management algorithms, configuration information, topology graphs or maps, packets, and historical position information for nearby (e.g., neighbor) nodes.

It will be appreciated that FIG. 18 is for illustrative purposes and that various nodes, their locations, and/or their functions may be changed, altered, added, or removed. For example, some nodes and/or functions may be combined into a single entity. In a second example, a node and/or function may be located at or implemented by two or more nodes.

Figure 19:
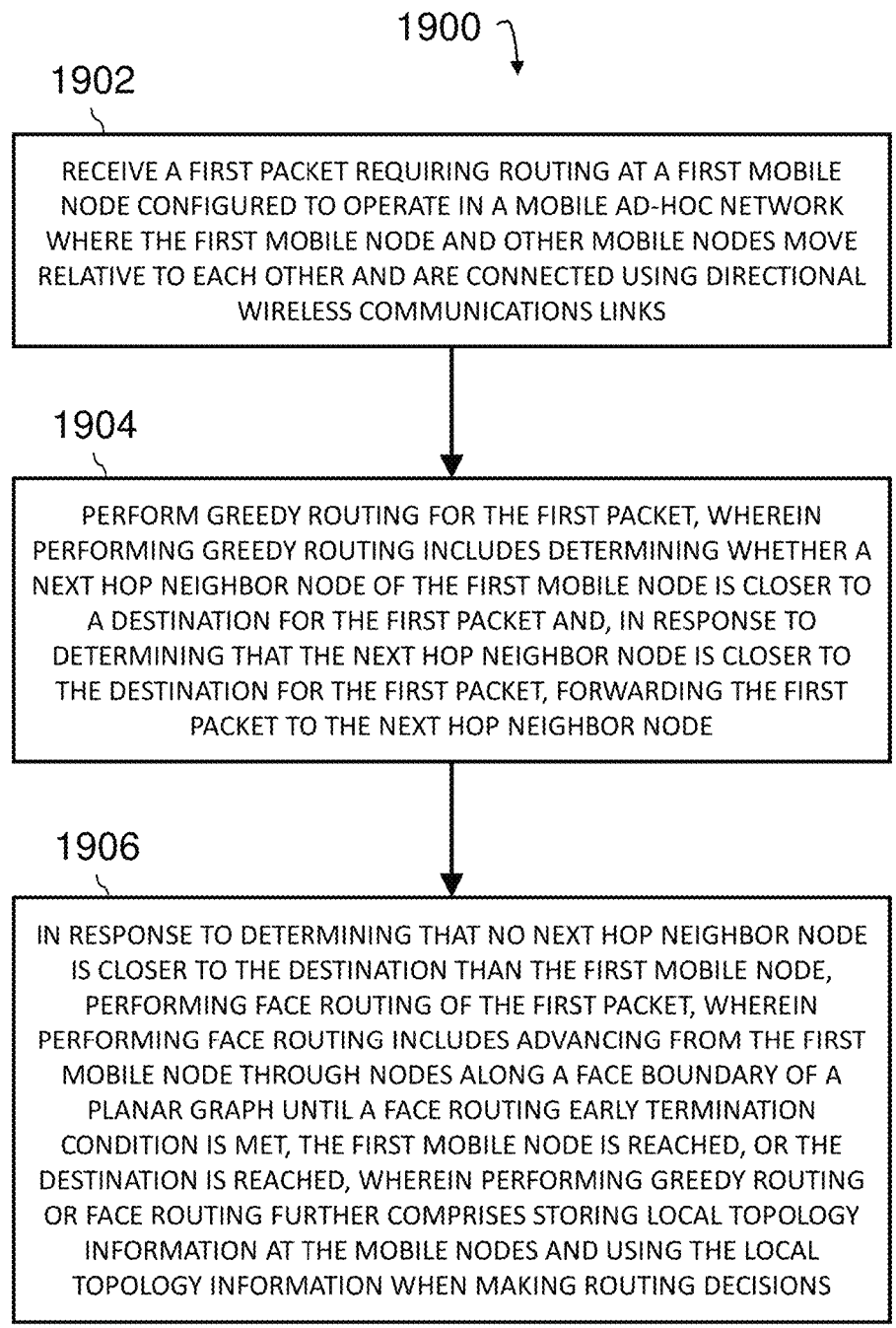
FIG. 19 is a diagram illustrating an example process for geographic routing in mobile ad-hoc networks according to an embodiment of the subject matter described herein.

FIG. 19 is a diagram illustrating an example process 1900 for geographic routing in mobile ad-hoc networks according to an embodiment of the subject matter described herein. In some embodiments, process 1900, or portions thereof, may be performed by or at system 102, a computer communicatively connected to system 102, or another node. For example, process 1900 may occur at a mobile node storing information about neighbor nodes at previous times.

Referring to process 1900, in step 1902, a first packet may be received. The first packet may require routing at a first mobile node configured to operate in a mobile ad-hoc network where the first mobile node and other mobile nodes move relative to each other and are connected using directional wireless communications links.

In step 1904, greedy routing may be performed for the first packet. Performing greedy routing may include determining whether a next hop neighbor node of the first mobile node is closer to the destination for the first packet and, in response to determining that the next hop neighbor node is closer to the destination for the first packet, forwarding the first packet to the next hop neighbor node;

In step 1906, in response to determining that no next hop neighbor node is closer to the destination than the first mobile node, face routing of the first packet may be performed. Performing face routing may include advancing from the first mobile node through nodes along a face boundary of a planar graph until a face routing early termination condition is met (e.g., visiting more nodes along a face boundary that are closer to a destination than are further from the destination, or visiting a node that is closer to the destination than the first mobile node), the first mobile node is reached, or the destination is reached. In some embodiments, performing greedy routing or face routing may further comprise storing local topology information at the nodes and using the local topology information when making routing decisions.

In some embodiments, storing and using local topology information may comprise including, in a first packet, a time at which a face traversal began, storing, at each of a plurality of nodes, positions and identifiers of directly connected nodes at a current time and at at least one time prior to the current time, and using the time in the first packet and the positions and identifiers to reconstruct a first topology of the face boundary at the time at which face traversal began and routing the first packet using the first topology.

In some embodiments, routing a first packet using a first topology may include determining that a next node along a face boundary at the time at which the face traversal began is not currently connected to a first mobile node, in response to determining that the next node along the face boundary is not currently connected to the first mobile node, adding additional header information to the first packet indicating the next node along the face boundary as the new (provisional) destination for the first packet, and routing to that node before removing the additional header information and continuing along the face boundary towards the original destination.

In some embodiments, a line segment from the first mobile node to the destination may be intersected with the next edge to be traversed along the face boundary, and in response to determining that the line segment intersects the next edge, restarting face routing at the current node, avoiding potential issues with graphs that are not unit-disk graphs.

In some embodiments, performing face routing may include utilizing local topology information for determining a direction to begin a face traversal, a size of a bounding circle, or a next hop for greedy routing. For example, depending on a known local topology, a mobile node may traverse a face of mobile nodes by selecting a particular direction (e.g., a clockwise direction or a counter-clockwise direction) in an attempt to reach the destination quicker.

In some embodiments, local topology information may include node position information received via automatic dependent surveillance—broadcast (ADS-B).

In some embodiments, a mobile node may perform topology management using a degree-constrained planar topology management algorithm. For example, a degree constrained planar topology management algorithm may include a DCP-Kruskal algorithm, a DCP-Kruskal+L algorithm, a DCP-Kruskal+S algorithm, a DCP-TRT+L algorithm, a DCP-GG algorithm, or a DCP-GG+L algorithm. For example, system 102 may use a topology management algorithm to select one or more other system in which to set up connections. In this example, the topology management algorithm may be configured to provide sufficient connectivity for routing messages in a highly dynamic mobile network.

It should be noted that system 102, RM 106, and/or functionality described herein may constitute a special purpose computing device.

The disclosure of each of the following references is incorporated herein by reference in its entirety.

REFERENCES

[1] J. Redi and R. Ramanathan, "The DARPA WNaN Network Architecture," in 2011—*MILCOM* 2011 *Military Communications Conference*, November 2011, pp. 2258-2263.

[2] DARPA, "Broad Agency Announcement BAA07-07 WNaN Adaptive Network Development (WAND)," February 2007. [Online]. Available: http://www.federal-grants.com/WNaN-Adaptive-Network-Development-WAND-8854.html

[3] T. Simonite, "10 breakthrough technologies: Project loon," *MIT Technology Review—Best in Tech:* 2015, pp. 20-25, 2016.

[4] E. Teller and W. Patrick, "Balloon clumping to provide bandwidth requested in advance," Nov. 21, 2013, WO Patent App. PCT/US2013/035,959. [Online]. Available: http://www.google.com/patents/WO2013173002A1?cl=en

[5] H. Frey, "Scalable geographic routing algorithms for wireless ad hoc networks," *Network Mag. of Global Internetwkg.*, vol. 18, no. 4, pp. 18-22, July 2004. [Online]. Available: http://dx.doi.org/10.1109/MNET.2004.1316756

[6] "Aircraft situation display to industry: Functional description and interface control document," Volpe Center, Tech. Rep. Version 4.0, August 2000, report no. ASDI-FD-001.

[7] F. Kuhn, R. Wattenhofer, and A. Zollinger, "Ad-hoc networks beyond unit disk graphs," in *Proceedings of the 2003 Joint Workshop on Foundations of Mobile Computing*, ser. DIALM-POMC '03. New York, N.Y., USA: ACM, 2003, pp. 69-78. [Online]. Available: http://doi.acm.org/10.1145/941079.941089

[8] Y.-J. Kim, R. Govindan, B. Karp, and S. Shenker, "On the pitfalls of geographic face routing," in Proceedings of the 2005 Joint Workshop on Foundations of Mobile Computing, ser. DIALM-POMC '05. New York, N.Y., USA: ACM, 2005, pp. 34-43. [Online]. Available: http://doi.acm.org/10.1145/1080810.1080818

[9] -, "Geographic routing made practical," in *Proceedings of the 2Nd Conference on Symposium on Networked Systems Design & Implementation—Volume 2*, ser. NSDI'05. Berkeley, Calif., USA: USENIX Association, 2005, pp. 217-230. [Online]. Available: http://dl.acm.org/citation.cfm?id=1251203.1251219

[10] H. Boche, A. Bourdoux, J. R. Fonollosa, T. Kaiser, A. Molisch, and W. Utschick, "Smart Antennas: state of the art," *IEEE Vehicular Technology Magazine*, vol. 1, no. 1, pp. 8-17, March 2006.

[11] Q. Balzano, J. Rzasa, S. Milner, and C. Davis, "High capacity tactical networks with reconfigerable, steerable, narrow-beam agile point-to-point RF links," in *Military Communications Conference, 2007. MILCOM 2007. IEEE*, October 2007, pp. 1-7.

[12] L. Stotts, N. Plasson, T. Martin, D. Young, and J. Juarez, "Progress towards reliable free-space optical networks," in *Military Communications Conference, 2011—MILCOM 2011*, November 2011, pp. 1720-1726.

[13] R. Devaul, E. Teller, C. Biffle, and J. Weaver, "Balloon network with free-space optical communication between super-node balloons and RF communication between super-node and sub-node balloons," Jul. 18, 2013, WO Patent App. PCT/US2013/020,705. [Online]. Available: https://www.google.com/patents/WO2013106348A1?cl=en

[14] M. Wohlsen, "Facebook drones to battle google balloons in the war of airborne internet," Wired, March 2014. [Online]. Available: http://www.wired.com/2014/03/facebooks-drones-launch-race-airborne-internet/

[15] B. Newton, J. Aikat, and K. Jeffay, "Analysis of topology algorithms for commercial airborne networks," in *Network Protocols (ICNP), 2014 IEEE 22nd International Conference on*, October 2014, pp. 368-373.

[16] Automatic Dependent Surveillance-Broadcast (ADS-B) Out Performance Requirements To Support Air Traffic Control (ATC) Service; Final Rule, Department of Transportation—Federal Aviation Administration Std. 14 CFR Part 91, May 2010. [Online]. Available: https://www.gpo.gov/fdsys/pkg/FR-2010-05-28/pdf/2010-12645.pdf

[17] B. Epstein and V. Mehta, "Free space optical communications routing performance in highly dynamic airspace environments," in *Proceedings of Aerospace Conference, IEEE.*, vol. 2, 2004, pp. 1398-1406 Vol. 2.

[18] B. Newton, J. Aikat, and K. Jeffay, "Simulating large-scale airborne networks with ns-3," in *Proceedings of the 2015 Workshop on Ns-3*, ser. WNS3 '15. New York, N.Y., USA: ACM, 2015, pp. 32-39. [Online]. Available: http://doi.acm.org/10.1145/2756509.2756514

[19] B. Karp and H. T. Kung, "GPSR: Greedy perimeter stateless routing for wireless networks," in *Proceedings of the 6th Annual International Conference on Mobile Computing and Networking*, ser. MobiCom '00. New York, N.Y., USA: ACM, 2000, pp. 243-254. [Online]. Available: http://doi.acm.org/10.1145/345910.345953

[20] J. Li, J. Jannotti, D. S. J. De Couto, D. R. Karger, and R. Morris, "A scalable location service for geographic ad hoc routing," in *Proceedings of the 6th Annual International Conference on Mobile Computing and Networking*, ser. MobiCom '00. New York, N.Y., USA: ACM, 2000, pp. 120-130. [Online]. Available: http://doi.acm.org/10.1145/345910.345931

[21] G. G. Finn, "Routing and Addressing Problems in Large Metropolitan-Scale Internetworks," University of Southern California IRI Research Report ISI/RR-87-180, March 1987.

[22] E. Kranakis, H. Singh, and J. Urrutia, "Compass Routing on Geometric Networks," in *IN PROC. 11 TH CANADIAN CONFERENCE ON COMPUTATIONAL GEOMETRY*, 1999, pp. 51-54.

[23] D. Q. O'Brien, "Maze demystified," New York Times, Jul. 26, 1989. [Online]. Available: http://www.nytimes.com/1989/07/28/opinion/l-maze-demystified-303989.html

[24] H. Frey and I. Stojmenovic, "On Delivery Guarantees and Worst-Case Forwarding Bounds of Elementary Face Routing Components in Ad Hoc And Sensor Networks," *IEEE Transactions on Computers*, vol. 59, no. 9, pp. 1224-1238, September 2010.

[25] F. Kuhn, R. Wattenhofer, and A. Zollinger, "Worst-Case Optimal and Average-Case Efficient Geometric Ad-Hoc Routing," in *Proceedings of the 4th ACM International Symposium on Mobile Ad Hoc Networking and Computing*, ser. MobiHoc '03. New York, N.Y., USA: ACM, 2003, pp. 267-278. [Online]. Available: http://doi.acm.org/10.1145/778415.778447

[26] P. Bose, P. Morin, I. Stojmenovic, and J. Urrutia, "Routing with Guaranteed Delivery in Ad Hoc Wireless Networks," in *Proceedings of the 3rd International Workshop on Discrete Algorithms and Methods for Mobile Computing and Communications*, ser. DIALM '99. New York, N.Y., USA: ACM, 1999, pp. 48-55. [Online]. Available: http://doi.acm.org/10.1145/313239.313282

[27] F. Cadger, K. Curran, J. Santos, and S. Moffett, "A Survey of Geographic Routing in Wireless Ad-Hoc Networks," *IEEE Communications Surveys Tutorials*, vol. 15, no. 2, pp. 621-653, Second 2013.

[28] F. Kuhn, R. Wattenhofer, Y. Zhang, and A. Zollinger, "Geometric ad-hoc routing: of theory and practice," in *Proceedings of the Twenty-second Annual Symposium on Principles of Distributed Computing*, ser. PODC '03. New York, N.Y., USA: ACM, 2003, pp. 63-72. [Online]. Available: http://doi.acm.org/10.1145/872035.872044

[29] B. Leong, S. Mitra, and B. Liskov, "Path vector face routing: geographic routing with local face information," in 13*TH IEEE International Conference on Network Protocols (ICNP'05)*, November 2005, pp. 12-.

[30] D. B. Johnson and D. A. Maltz, "Dynamic source routing in ad hoc wireless networks," in *Mobile Computing*. Kluwer Academic Publishers, 1996, pp. 153-181.

[31] E. Rosen, A. Viswanathan, and R. Callon, "Multiprotocol label switching architecture," Internet Requests for Comments, RFC Editor, RFC 3031, January 2001. [Online]. Available: http://www.rfc-editor.org/rfc/rfc3031.txt

[32] K. Miyao, H. Nakayama, N. Ansari, and N. Kato, "LTRT: An efficient and reliable topology control algorithm for ad-hoc networks," *IEEE Transactions on Wireless Communications*, vol. 8, no. 12, pp. 6050-6058, December 2009.

[33] G. F. Riley and T. R. Henderson, "The ns-3 Network Simulator." in *Modeling and Tools for Network Simulation*, K. Wehrle, M. Gnes, and J. Gross, Eds. Springer, 2010, pp. 15-34. [Online]. Available: http://link.springer.com/chapter/10.1007%2F978-3-642-12331-3 2

[34] T. Clausen, P. Jacquet, C. Adjih, A. Laouiti, P. Minet, P. Muhlethaler, A. Qayyum, and L. Viennot, "Optimized Link State Routing Protocol (OLSR)," 2003, Network Working Group. [Online]. Available: http://hal.inria.fr/inria-00471712
[35] "2016 broadband progress report," Federal Communications Commission, Tech. Rep., January 2016.
[36] "State of connectivity 2015: A report on global internet access," internet.org by Facebook, Tech. Rep., February 2016. [Online]. Available: https://fbnewsroomus.files.wordpress.com/2016/02/state-of-connectivity-2015-2016-02-21-final.pdf
[37] H. Kelly, "Facebook looks to drones, lasers and satellites for internet access," CNN, March 2014.
[38] T. Peyronel, K. J. Quirk, S. C. Wang, and T. G. Tiecke, "Luminescent detector for free-space optical communication," *Optica*, vol. 3, no. 7, pp. 787-792, July 2016.
[39] E. Demirors, B. G. Shankar, G. E. Santagati, and T. Melodia, "Seanet: A software-defined acoustic networking framework for reconfigurable underwater networking," in *Proceedings of the 10th International Conference on Underwater Networks & Systems*, ser. WUWNET '15. New York, N.Y., USA: ACM, 2015, pp. 11:1-11:8. [Online]. Available: http://doi.acm.org/10.1145/2831296.2831316
[40] D. Boroson, J. Scozzafava, D. Murphy, B. Robinson, and H. Shaw, "The lunar laser communications demonstration (llcd)," in *Space Mission Challenges for Information Technology*, 2009. SMC-IT 2009. Third IEEE International Conference on, July 2009, pp. 23-28.
[41] P. Santi, "Topology control in wireless ad hoc and sensor networks," *ACM Comput. Surv.*, vol. 37, no. 2, pp. 164-194, June 2005.
[42] S. D. Milner, T.-H. Ho, I. I. Smolyaninov, S. Trisno, and C. C. Davis, "Free-space optical wireless links with topology control," pp. 175-180, 2002. [Online]. Available: http://dx.doi.org/10.1117/12.450627
[43] Z. Huang, C.-C. Shen, C. Srisathapornphat, and C. Jaikaeo, "Topology control for ad hoc networks with directional antennas," in *Computer Communications and Networks*, 2002. Proceedings. Eleventh International Conference on, 2002, pp. 16-21.
[44] N. Ansari, G. Cheng, and R. Krishnan, "Efficient and reliable link state information dissemination," Communications Letters, *IEEE*, vol. 8, no. 5, pp. 317-319, May 2004.
[45] N. Krishnamurthi, A. Ganguli, A. Tiwari, B.-H. Shen, J. Yadegar, and G. Hadynski, "Topology control for future airborne networks," in *Military Communications Conference*, 2009. MILCOM 2009. IEEE, 2009, pp. 1-7.
[46] A. Tiwari, A. Ganguli, A. Sampath, D. Anderson, B.-H. Shen, N. Krishnamurthi, J. Yadegar, M. Gerla, and D. Krzysiak, "Mobility aware routing for the airborne network backbone," in *Military Communications Conference*, 2008. MILCOM 2008. IEEE, 2008, pp. 1-7.
[47] M. R. Garey and D. S. Johnson, *Computers and Intractability: A Guide to the Theory of NP-Completeness*. New York, N.Y., USA: W. H. Freeman & Co., 1979.

Various combinations and sub-combinations of the structures and features described herein are contemplated and will be apparent to a skilled person having knowledge of this disclosure. Any of the various features and elements as disclosed herein may be combined with one or more other disclosed features and elements unless indicated to the contrary herein. Correspondingly, the subject matter as hereinafter claimed is intended to be broadly construed and interpreted, as including all such variations, modifications and alternative embodiments, within its scope and including equivalents of the claims. It is understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for geographic routing in mobile ad-hoc networks, the method comprising:
   receiving a first packet requiring routing at a first mobile node configured to operate in a mobile ad-hoc network where the first mobile node and other mobile nodes move relative to each other and are connected using directional wireless communications links;
   performing greedy routing for the first packet, wherein performing greedy routing includes determining whether a next hop neighbor node of the first mobile node is closer to a destination for the first packet and, in response to determining that the next hop neighbor node is closer to the destination for the first packet, forwarding the first packet to the next hop neighbor node;
   in response to determining that no next hop neighbor node is closer to the destination than the first mobile node, performing face routing of the first packet, wherein performing face routing includes advancing from the first mobile node through nodes along a face boundary of a planar graph until a face routing early termination condition is met, the first mobile node is reached, or the destination is reached;
   wherein performing greedy routing further comprising using local topology information at the mobile nodes; and
   wherein performing face routing further comprises using the local topology information at the mobile nodes, wherein the local topology information at a second mobile node includes positions and identifiers of nodes directly connected to the second mobile node at different times, wherein the nodes directly connected to the second mobile node at a current time are different than the nodes directly connected to the second mobile node at the time face routing began, wherein the local topology information at the second mobile node is usable for making a routing decision at the second mobile node based on the nodes directly connected to the second mobile node at the time face routing began.

2. The method of claim 1 wherein using the local topology information comprises:
   at the second mobile node along the face boundary:
   receiving the first packet, wherein the first packet indicates the time at which the face routing began; and
   using the time in the first packet and the positions and identifiers to determine a next node to be visited along the face boundary at the time at which face routing began.

3. The method of claim 2 comprising:
   at the second mobile node along the face boundary:
   determining that the next node along the face boundary at the time at which the face routing began is not currently connected to the first mobile node;
   in response to determining that the next node along the face boundary is not currently connected to the first mobile node, adding additional header information to the first packet indicating the next node along the face boundary as a provisional destination for the first packet; and
routing to the next node along the face boundary before removing the additional header information and continuing face routing towards the original destination.

4. The method of claim 1 comprising:
at the second mobile node along the face boundary:
determining whether, in a projection of the nodes and connections onto a 2-dimensional plane, a line segment from the projection of the first mobile node to the projection of the destination intersects a second line segment from the projection of the second mobile node to the projection of a next node to be visited along the face boundary; and
in response to determining that the line segment intersects the second line segment, restarting face routing from the second mobile node.

5. The method of claim 1 wherein the directional wireless communications links use radio frequency (RF) or free-space optics (FSO) technology.

6. The method of claim 1 wherein using the local topology information includes utilizing the local topology information for determining a direction to begin the face routing, a size of a bounding circle, or the next hop for greedy routing.

7. The method of claim 6 wherein the local topology information includes node position information received via automatic dependent surveillance—broadcast (ADS-B).

8. The method of claim 1 wherein the first mobile node performs topology management using a degree-constrained planar topology management algorithm.

9. The method of claim 8 wherein the degree constrained planar topology management algorithm includes a degree-constrained planar Kruskal (DCP-Kruskal) algorithm, a DCP-Kruskal plus long algorithm (DCP-Kruskal+L), a DCP-Kruskal plus short algorithm (DCP-Kruskal+S), a degree-constrained planar tree-based reliable topology plus long (DCP-TRT+L) algorithm, a degree-constrained Gabriel graph algorithm (DCP-GG), or a Gabriel graph plus long algorithm (DCP-GG+L).

10. A system for geographic routing in mobile ad-hoc networks,
the system comprising:
a first mobile node comprising:
at least one memory;
at least one processor; and
a routing module (RM) implemented using the at least one processor and the at least one memory, wherein the RM is configured for:
receiving a first packet requiring routing at the first mobile node configured to operate in a mobile ad-hoc network where the first mobile node and other mobile nodes move relative to each other and are connected using directional wireless communications links;
performing greedy routing for the first packet, wherein performing greedy routing includes determining whether a next hop neighbor node of the first mobile node is closer to a destination for the first packet and, in response to determining that the next hop neighbor node is closer to the destination for the first packet, forwarding the first packet to the next hop neighbor node;
in response to determining that no next hop neighbor node is closer to the destination than the first mobile node, performing face routing of the first packet, wherein performing face routing includes advancing from the first mobile node through nodes along a face boundary of a planar graph until a face routing early termination condition is met, the first mobile node is reached, or the destination is reached;
wherein performing greedy routing further comprising using local topology information at the mobile nodes; and
wherein performing face routing further comprises using the local topology information at the mobile nodes, wherein the local topology information at a second mobile node includes positions and identifiers of nodes directly connected to the second mobile node at different times, wherein the nodes directly connected to the second mobile node at a current time are different than the nodes directly connected to the second mobile node at the time face routing began, wherein the local topology information at the second mobile node is usable for making a routing decision at the second mobile node based on the nodes directly connected to the second mobile node at the time face routing began.

11. The system of claim 10 wherein using the local topology information comprises:
at the second mobile node along the face boundary:
receiving the first packet, wherein the first packet indicates the time at which the face routing began; and
using the time in the first packet and the positions and identifiers to determine a next node to be visited along the face boundary at the time at which face routing began.

12. The system of claim 11 comprising:
at the second mobile node along the face boundary:
determining that the next node along the face boundary at the time at which the face routing began is not currently connected to the first mobile node;
in response to determining that the next node along the face boundary is not currently connected to the first mobile node, adding additional header information to the first packet indicating the next node along the face boundary as a provisional destination for the first packet; and
routing to the next node along the face boundary before removing the additional header information and continuing face routing towards the original destination.

13. The system of claim 10 comprising:
at the second mobile node along the face boundary:
determining whether, in a projection of the nodes and connections onto a 2-dimensional plane, a line segment from the projection of the first mobile node to the projection of the intersects a second line segment from the projection of the second mobile node to the projection of a next node to be visited along the face boundary; and
in response to determining that the line segment intersects the second line segment, restarting face routing from the second mobile node.

14. The system of claim 10 wherein the directional wireless communications links use free-space optics (FSO) technology.

15. The system of claim 10 wherein the directional wireless communications links use radio frequency (RF) technology.

16. The system of claim 10 wherein using the local topology information when includes utilizing the local topology information for determining a direction to begin the face routing, a size of a bounding circle, or the next hop for greedy routing.

17. The system of claim 16 wherein the local topology information includes node position information received via automatic dependent surveillance—broadcast (ADS-B).

18. The system of claim 10 wherein the first mobile node performs topology management using a degree-constrained planar topology management algorithm.

19. The system of claim 18 wherein the degree constrained planar topology management algorithm includes a degree-constrained planar Kruskal (DCP-Kruskal) algorithm, a DCP-Kruskal plus long algorithm, a DCP-Kruskal plus short algorithm, a degree-constrained planar tree-based reliable topology plus long (DCP-TRT+L) algorithm, or a degree-constrained, Gabriel graph plus long algorithm.

20. A non-transitory computer readable medium having stored thereon executable instructions that when executed by at least one processor of a computer cause the computer to perform steps comprising:

receiving a first packet requiring routing at a first mobile node configured to operate in a mobile ad-hoc network where the first mobile node and other mobile nodes move relative to each other and are connected using directional wireless communications links;

performing greedy routing for the first packet, wherein performing greedy routing includes determining whether a next hop neighbor node of the first mobile node is closer to a destination for the first packet and, in response to determining that the next hop neighbor node is closer to the destination for the first packet, forwarding the first packet to the next hop neighbor node;

in response to determining that no next hop neighbor node is closer to the destination than the first mobile node, performing face routing of the first packet, wherein performing face routing includes advancing from the first mobile node through nodes along a face boundary of a planar graph until a face routing early termination condition is met, the first mobile node is reached, or the destination is reached;

wherein performing greedy routing further comprising using local topology information at the mobile nodes; and wherein performing face routing further comprises using the local topology information at the mobile nodes, wherein the local topology information at a second mobile node includes positions and identifiers of nodes directly connected to the second mobile node at different times, wherein the nodes directly connected to the second mobile node at a current time are different than the nodes directly connected to the second mobile node at the time face routing began, wherein the local topology information at the second mobile node is usable for making a routing decision at the second mobile node based on the nodes directly connected to the second mobile node at the time face routing began.

* * * * *